United States Patent [19]

Sakamoto

[11] Patent Number: 5,602,680
[45] Date of Patent: Feb. 11, 1997

[54] FINITE CONJUGATE DISTANCE ZOOM LENS SYSTEM

[75] Inventor: Keijiro Sakamoto, Toyokawa, Japan

[73] Assignee: Minolta Co., Ltd., Osaka, Japan

[21] Appl. No.: 374,132

[22] Filed: Jan. 18, 1995

[30] Foreign Application Priority Data

Jan. 20, 1994 [JP] Japan ..................... 6-004658

[51] Int. Cl.$^6$ ..................................... G02B 15/14
[52] U.S. Cl. .............................. 359/679; 359/691
[58] Field of Search .................... 359/676, 679, 359/680, 681, 682, 686, 687, 688, 692

[56] References Cited

U.S. PATENT DOCUMENTS

| | | | |
|---|---|---|---|
| 4,838,668 | 6/1989 | Betensky et al. | 359/680 |
| 5,082,360 | 1/1992 | Sato et al. | 359/692 |
| 5,105,311 | 4/1992 | Tokumaru et al. | 359/676 |
| 5,144,489 | 9/1992 | Shibayama | 359/692 |
| 5,218,476 | 6/1993 | Ito | 359/687 |
| 5,270,864 | 12/1993 | Watanabe | 359/679 |
| 5,345,338 | 9/1994 | Ueda et al. | 359/679 |

*Primary Examiner*—Scott J. Sugarman
*Assistant Examiner*—Jordan M. Schwartz
*Attorney, Agent, or Firm*—Price, Gess & Ubell

[57] ABSTRACT

A finite conjugate distance zoom lens system includes sequentially from the enlarging side a first lens group having a negative refracting power and a second lens group having a positive refracting power. The second lens group consists of sequentially from the enlarging side two or three positive lens elements, first and second cemented lenses, a negative lens element, and a positive lens element. Both of the first and second lenses consist of cemented biconvex lens element and negative lens element. During a zooming operation from the maximum focal length edge to the minimum focal length edge, the first lens group shifts from the enlarging side to the reducing side on the maximum focal length side and shifts from the reducing side to the enlarging side on the minimum focal length side. On the other hand, the second lens group monotonously shifts from the enlarging side to the reducing side during the zooming operation.

30 Claims, 15 Drawing Sheets

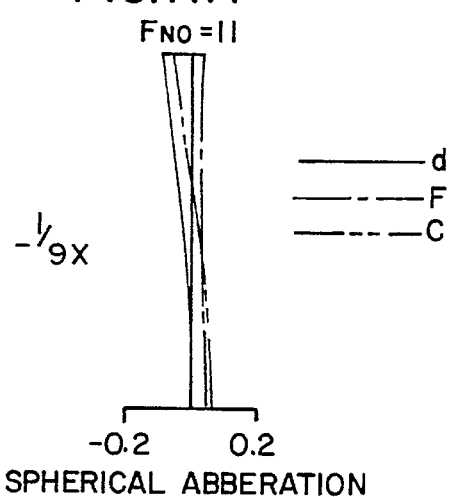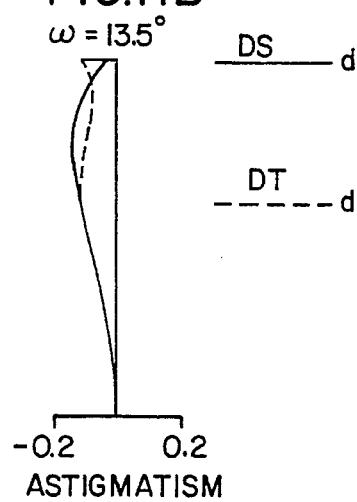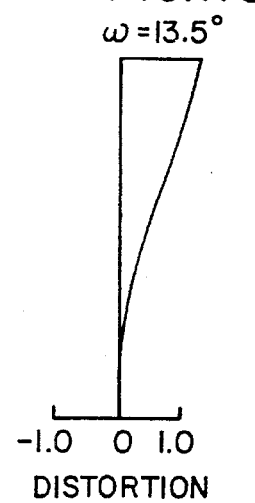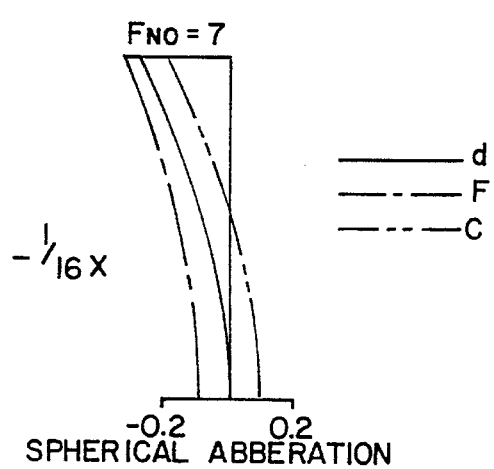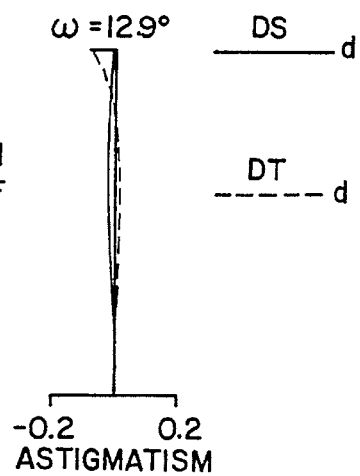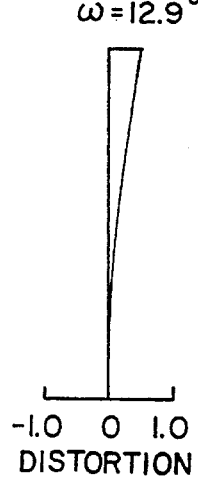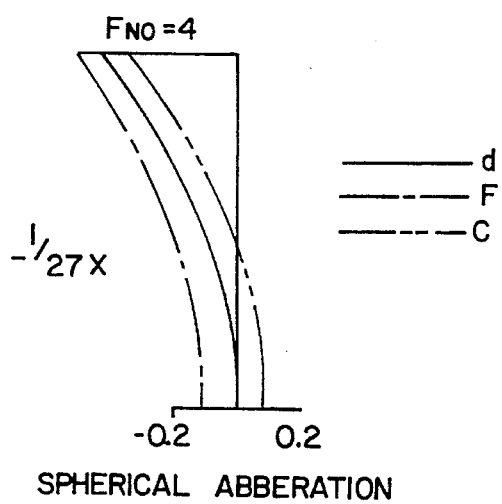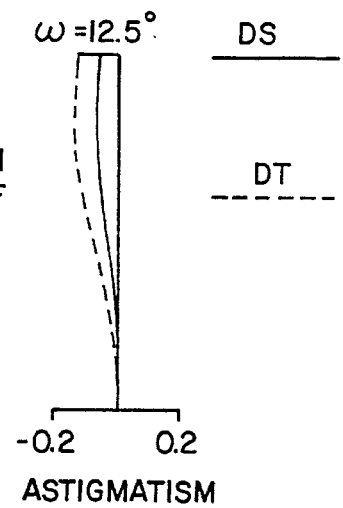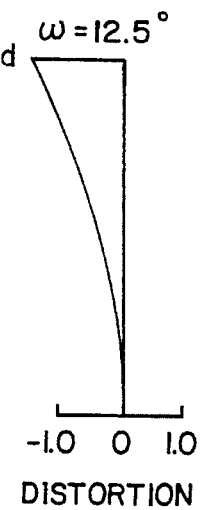

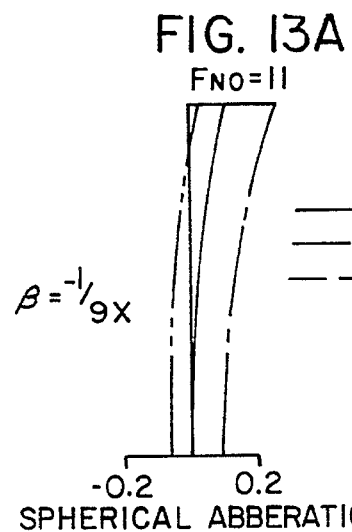
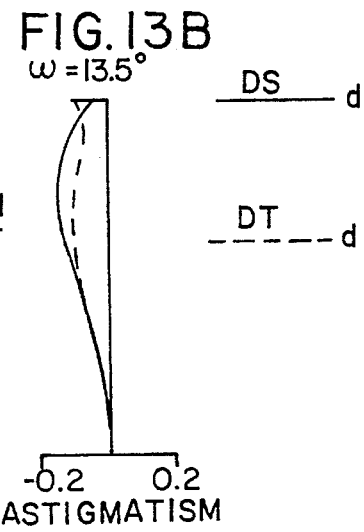
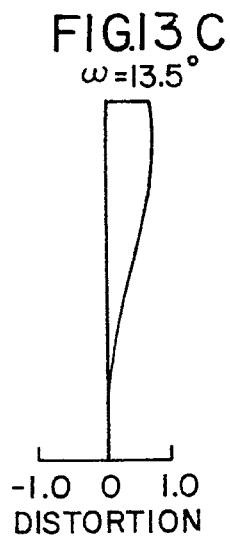
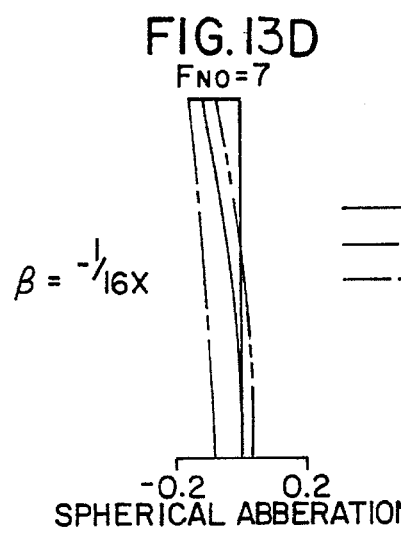
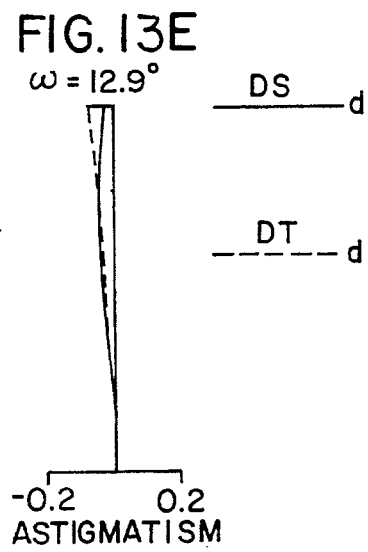
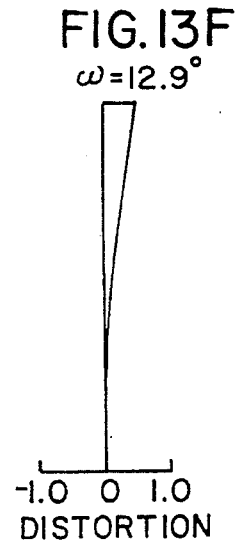
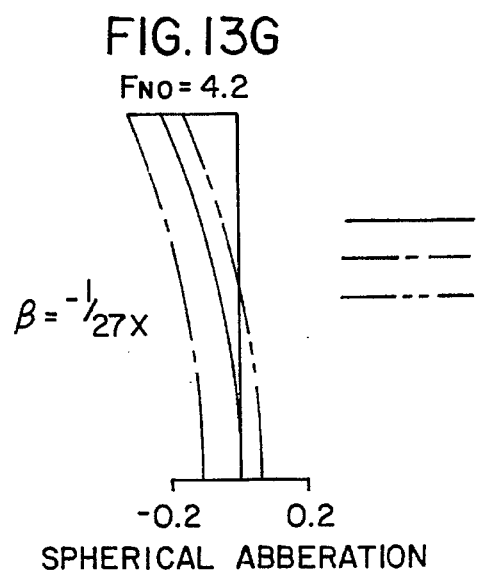
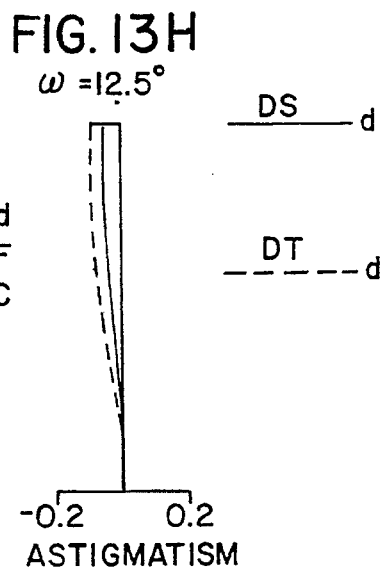
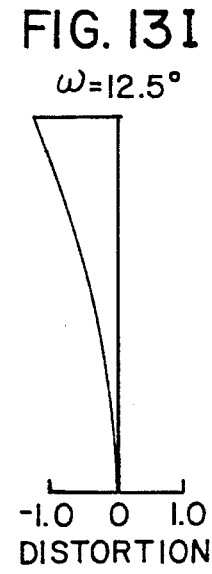

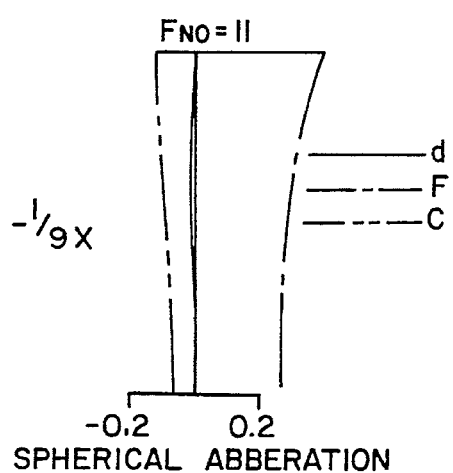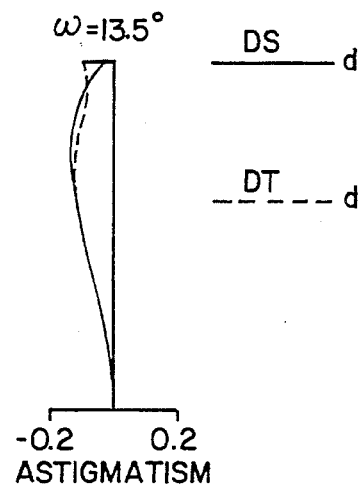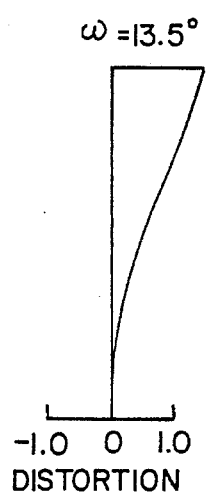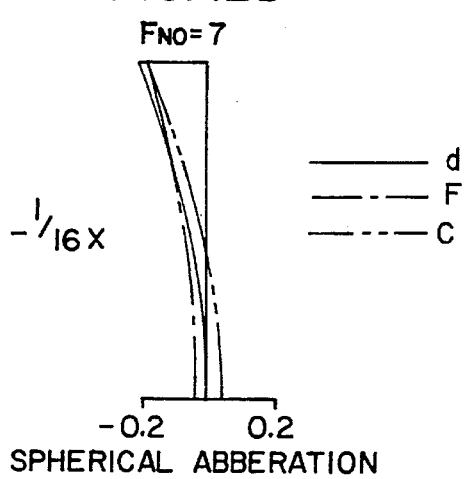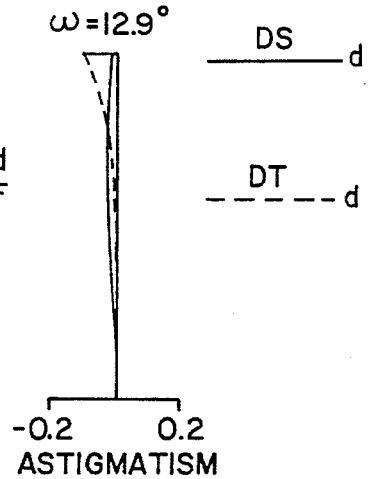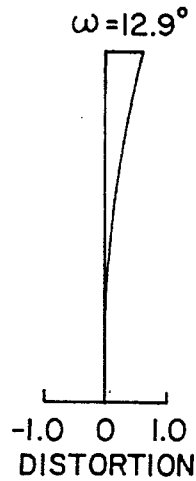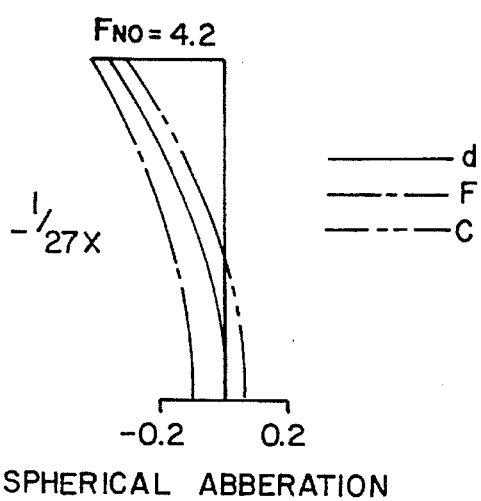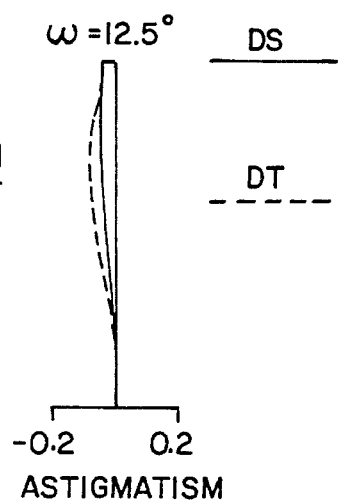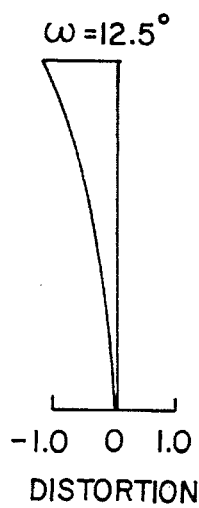

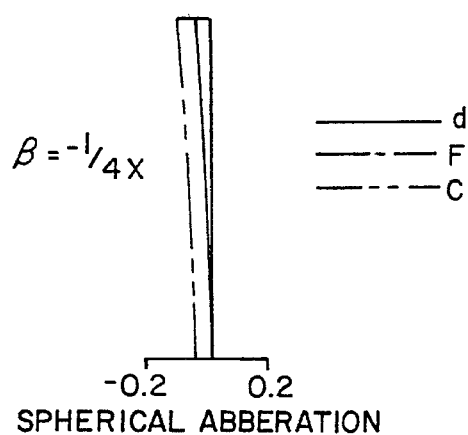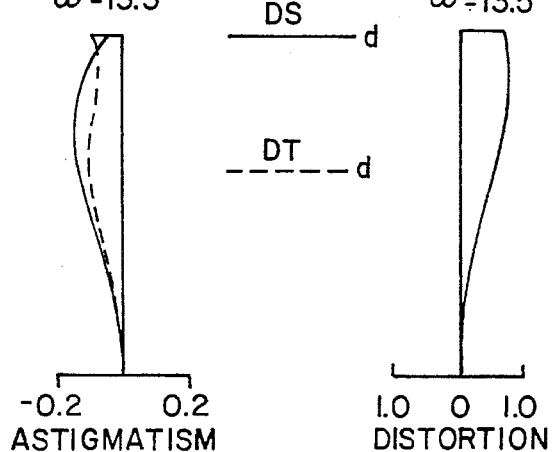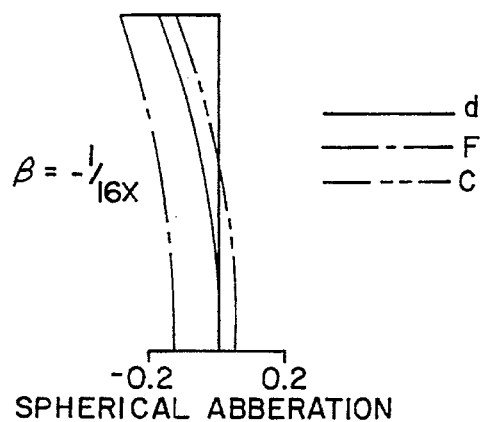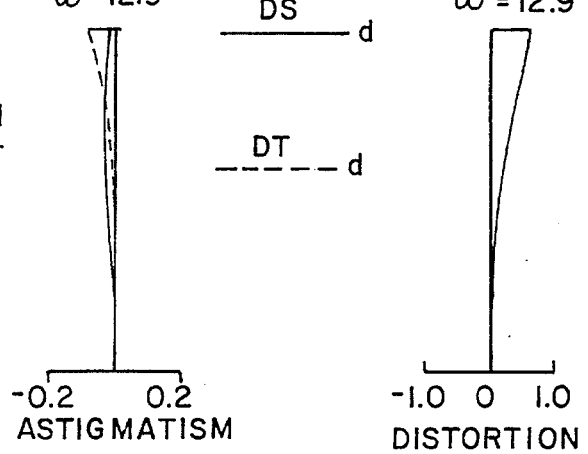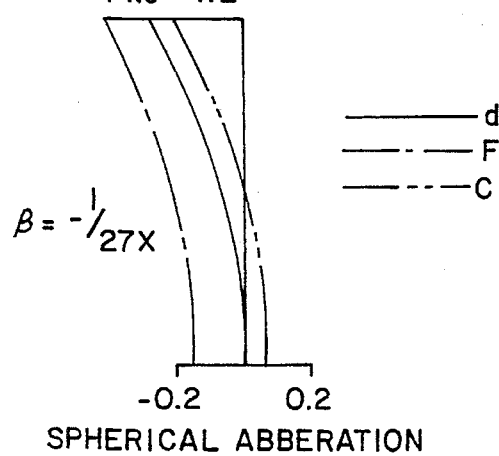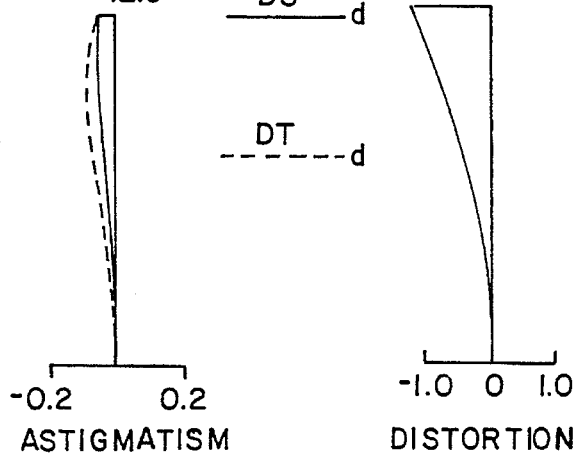

FIG.15A
$F_{NO}=11$
$\beta = -1/9x$
SPHERICAL ABBERATION
FIG.15B
$\omega = 13.5°$
— d
—·— F
—··— C
ASTIGMATISM
FIG.15C
$\omega = 13.5°$
——— DS d
----- DT d
DISTORTION
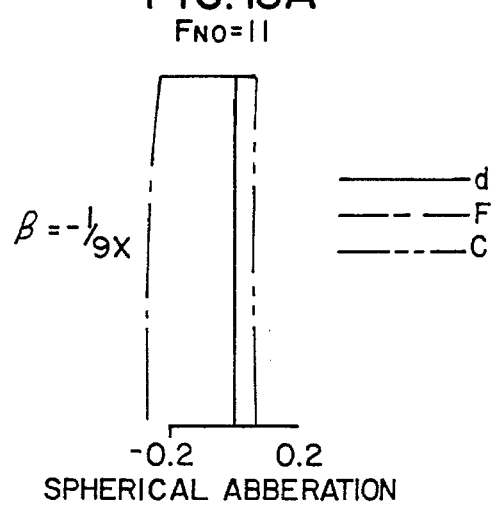
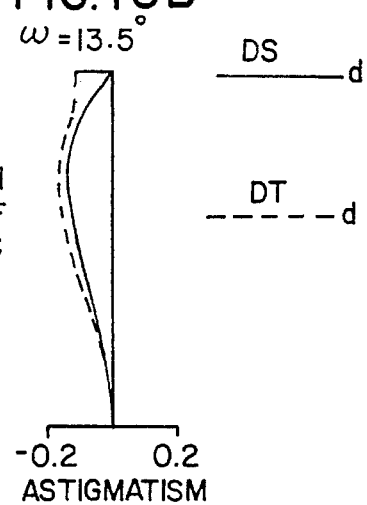
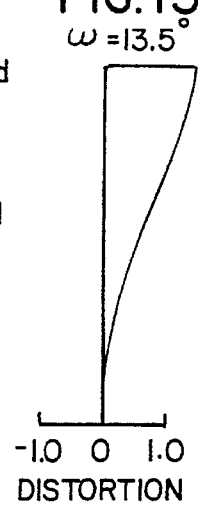
FIG.15D
$F_{NO}=7$
$\beta = -1/16x$
SPHERICAL ABBERATION
FIG.15E
$\omega = 12.9°$
— d
—·— F
—··— C
ASTIGMATISM
FIG.15F
$\omega = 12.9°$
——— DS d
----- DT d
DISTORTION
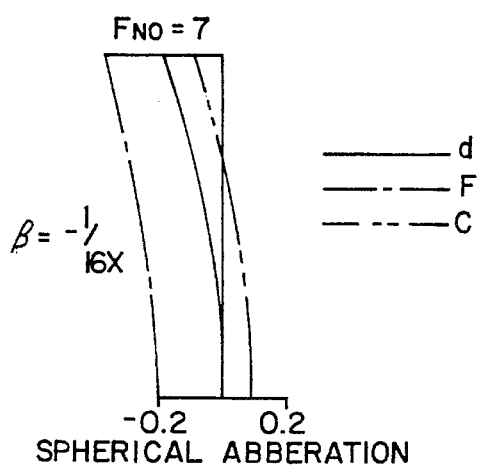
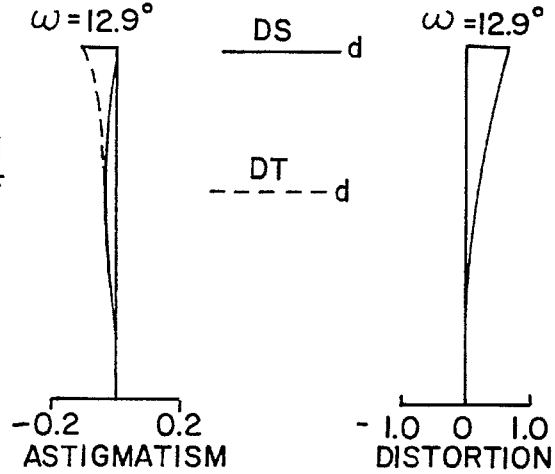
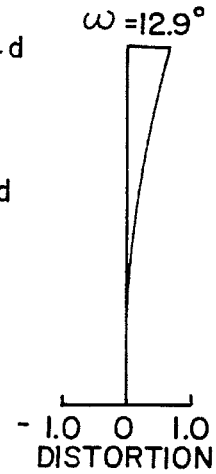
FIG.15G
$F_{NO}=4.3$
$\beta = -1/27x$
SPHERICAL ABBERATION
FIG.15H
$\omega = 12.5°$
— d
—·— F
—··— C
ASTIGMATISM
FIG.15I
$\omega = 12.5°$
——— DS d
----- DT d
DISTORTION
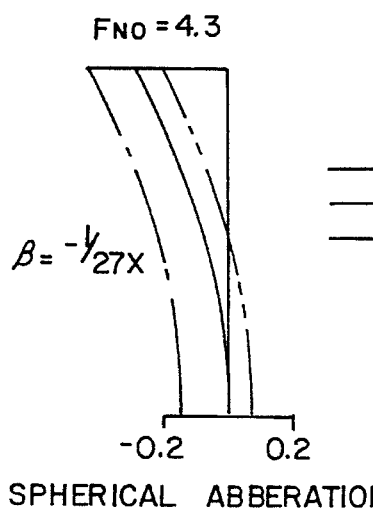
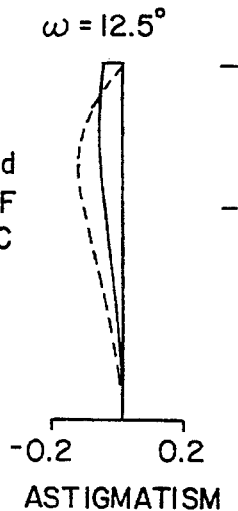
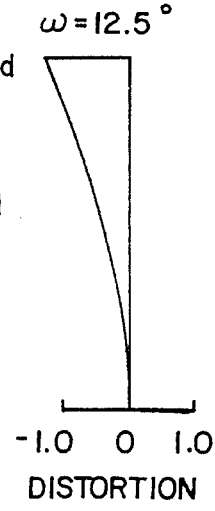

FNO=11
$\beta = -1/9X$
— d
—·— F
—--— C
-0.2  0.2
SPHERICAL ABBERATION $\omega = 13.5°$
DS ——— d
DT ----- d
-0.2  0.2
ASTIGMATISM $\omega = 13.5°$
1.0  0  1.0
DISTORTION FNO=7
$\beta = -1/16X$
— d
—·— F
—--— C
-0.2  0.2
SPHERICAL ABBERATION $\omega = 12.9°$
DS ——— d
DT ----- d
-0.2  0.2
ASTIGMATISM $\omega = 12.9°$
-1.0  0  1.0
DISTORTION FNO = 4.3
$\beta = -1/27X$
— d
—·— F
—--— C
-0.2  0.2
SPHERICAL ABBERATION $\omega = 12.5°$
DS ——— d
DT ----- d
-0.2  0.2
ASTIGMATISM $\omega = 12.5°$
-1.0  0  1.0
DISTORTION

FINITE CONJUGATE DISTANCE ZOOM LENS SYSTEM

BACKGROUND OF THE INVENTION

1. Field of the Invention

The present invention relates to a finite conjugate distance zoom lens system for projection used in microfilm readers, microfilm reader printers and the like.

2. Description of the Related Art

Typically, in microfilm readers, microfilm reader printers and the like, a finite conjugate distance zoom lens is used as a projection lens to project an enlargement of a microfilm image onto a screen, and an image rotation prism is disposed on the enlarging side of said infinite conjugate distance zoom lens system between said finite conjugate distance zoom lens system and said screen, such that the image projected on the screen can be rotated by rotating said prism to correct the direction of the image. The overall length of the finite conjugate distance zoom lens system is conventionally shortened to maintain the space for disposition of the image rotation prism on the enlarging side of said finite conjugate distance zoom lens system.

A finite conjugate distance zoom lens system disclosed in Japanese Unexamined Patent Application No. HEI 4-328709, for example, consists of sequentially from the enlarging side a first lens group having negative refracting power, aperture stop, second lens group having positive refracting power, and third lens group having negative refracting power. Regarding zooming from a longest focal length state to the shortest focal length state, the first lens group is fixedly mounted relative to the image plane, and the second and third lens groups are discretely adjustable so as to move toward the reducing side, and the spacing between said second and third lens groups shifts from decreasing to increasing. The overall zoom lens system is a telephoto type due to the negative refracting power of the final lens group, i.e., the third lens group, thereby shortening the overall length of the lens.

In the aforesaid finite conjugate distance zoom lens system, the second lens group comprises sequentially from the enlarging side at least one positive lens, and a cemented lens comprising a biconvex lens and a negative lens confronting a concave surface on the enlarging side, and a positive lens. Furthermore, the third lens group comprises sequentially from the enlarging side a negative lens confronting a concave surface to the enlarging side, and a biconvex lens.

However, the finite conjugate distance zoom lens system disclosed in the aforesaid Japanese patent application has a magnification range of about 1/9~1/16, and a small zoom ratio of about 1.78. When the zoom ratio of the aforesaid finite conjugate distance zoom lens system is simply increased, the overall lens length is increased, and curvature of field is increased at both the maximum focal length state and minimum focal length state. Furthermore, magnification chromatic aberration is increased because the lens providing chromatic aberration correction is only a single cemented lens.

SUMMARY OF THE INVENTION

A main object of the present invention is to provide a finite conjugate distance zoom lens system capable of reducing overall lens length and increasing zoom ratio.

Another object of the present invention is to provide a finite conjugate distance zoom lens system with minimal magnification chromatic aberration.

These objects of the present invention are accomplished by providing a finite conjugate distance zoom lens system comprising sequentially from the enlarging side a first lens group having negative refracting power, and second lens group having positive refracting power, wherein zooming from a longest focal length state to a shortest focal length state lens movement is accomplished by individually shifting said first lens group from the enlarging side to the reducing side between the longest focal length state and an intermediate focal length state and then shifting from the reducing side to the enlarging side between the intermediate focal length state to the shortest focal length state, and shifting said second lens group from the enlarging side to the reducing side, said second lens group comprises sequentially from the enlarging side at least two positive lenses, first and second cemented lenses (both of which include cemented biconvex lens and negative lens), negative lens confronting a concave surface on the enlarging side, and positive lens, and wherein the refractive index of lens included in each cemented lenses satisfies predetermined equations.

These and other objects, advantages and features of the present invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

FIGS. 11A–11I are aberration curves of the second embodiment;

FIGS. 12–12I are aberration curves of the third embodiment;

FIGS. 13A–13I are aberration curves of the fourth embodiment;

FIGS. 14A–14I are aberration curves of the fifth embodiment;

FIGS. 15A–15I are aberration curves of the sixth embodiment;

DETAILED DESCRIPTION OF THE PREFERRED EMBODIMENTS

The preferred embodiments of the present invention are described hereinafter.

Figure 1:
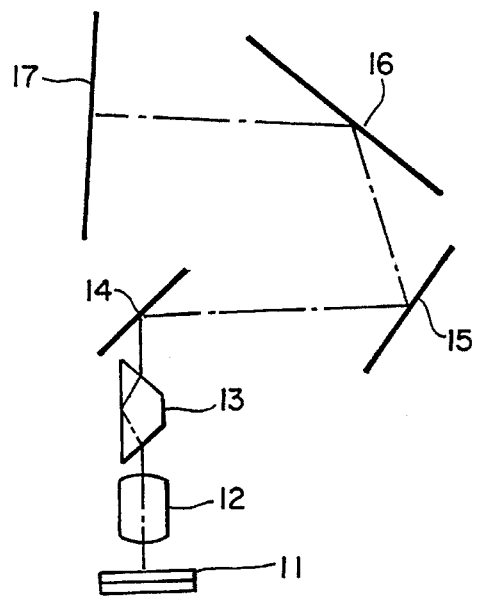
FIG. 1 is an illustration showing the optical path of a microfilm reader using the finite conjugate distance zoom lens system of the present invention.

FIG. 1 is an illustration of a microfilm reader using the finite conjugate distance zoom lens system of the present invention. Microfilm 11 is illuminated by an illumination optical system not shown in the drawings, and the image of microfilm 11 is projected via a finite conjugate distance zoom lens system 12, and subsequently projected onto screen 17 at variable magnification via image rotation prism 13 and mirrors 14–16. A Dove prism, for example, is interposed between finite conjugate distance zoom lens system 12 and screen 17 as image rotation prism 13. An aperture stop is arranged near the enlarging side of finite conjugate distance zoom lens system 12 to render the image rotation prism 13 more compact.

Figure 2:
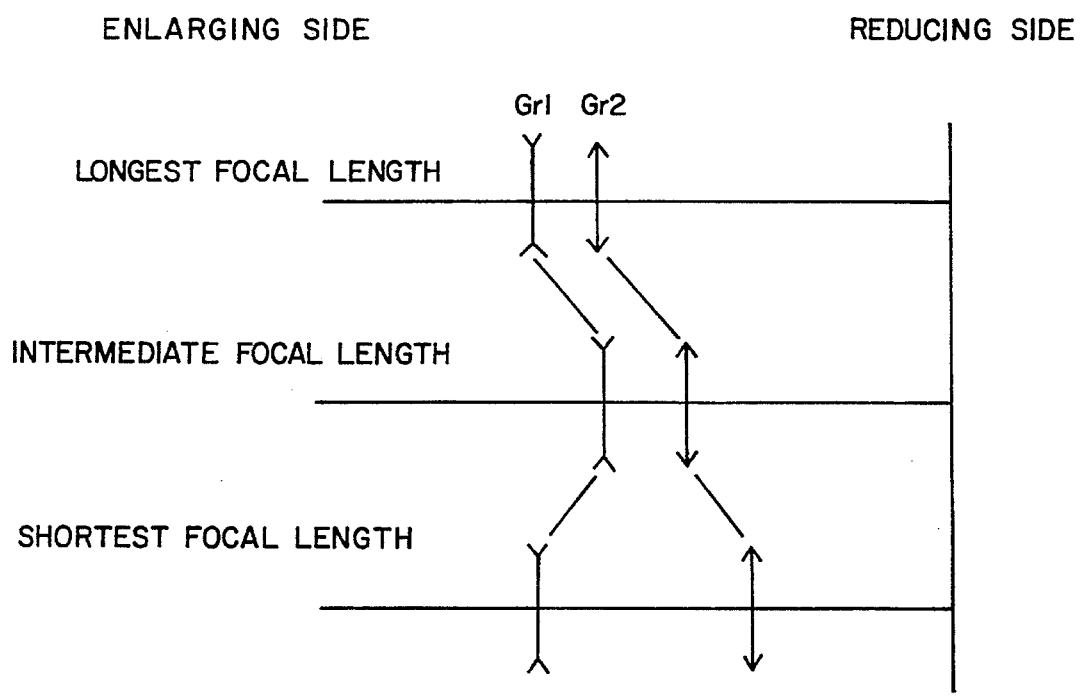
FIG. 2 shows the zoom movement of the two lens groups included in the finite conjugate distance zoom lens system of the present invention.
Figure 3:
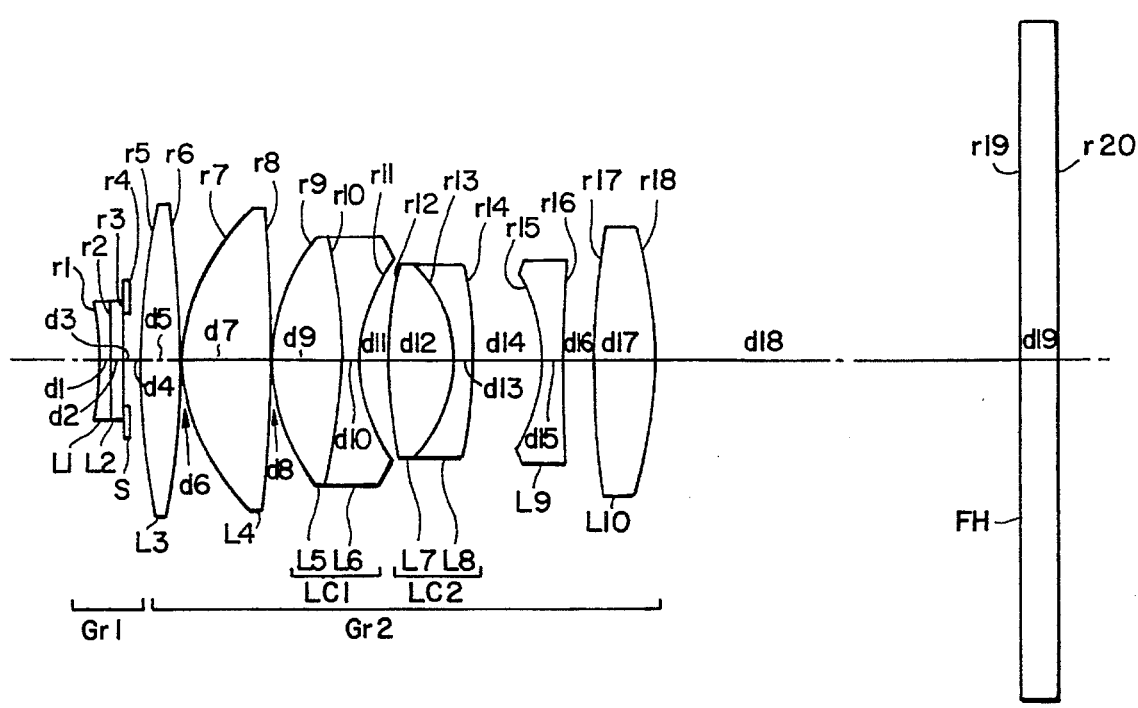
FIG. 3 is a section view showing the lens construction of a first embodiment.
Figure 4:
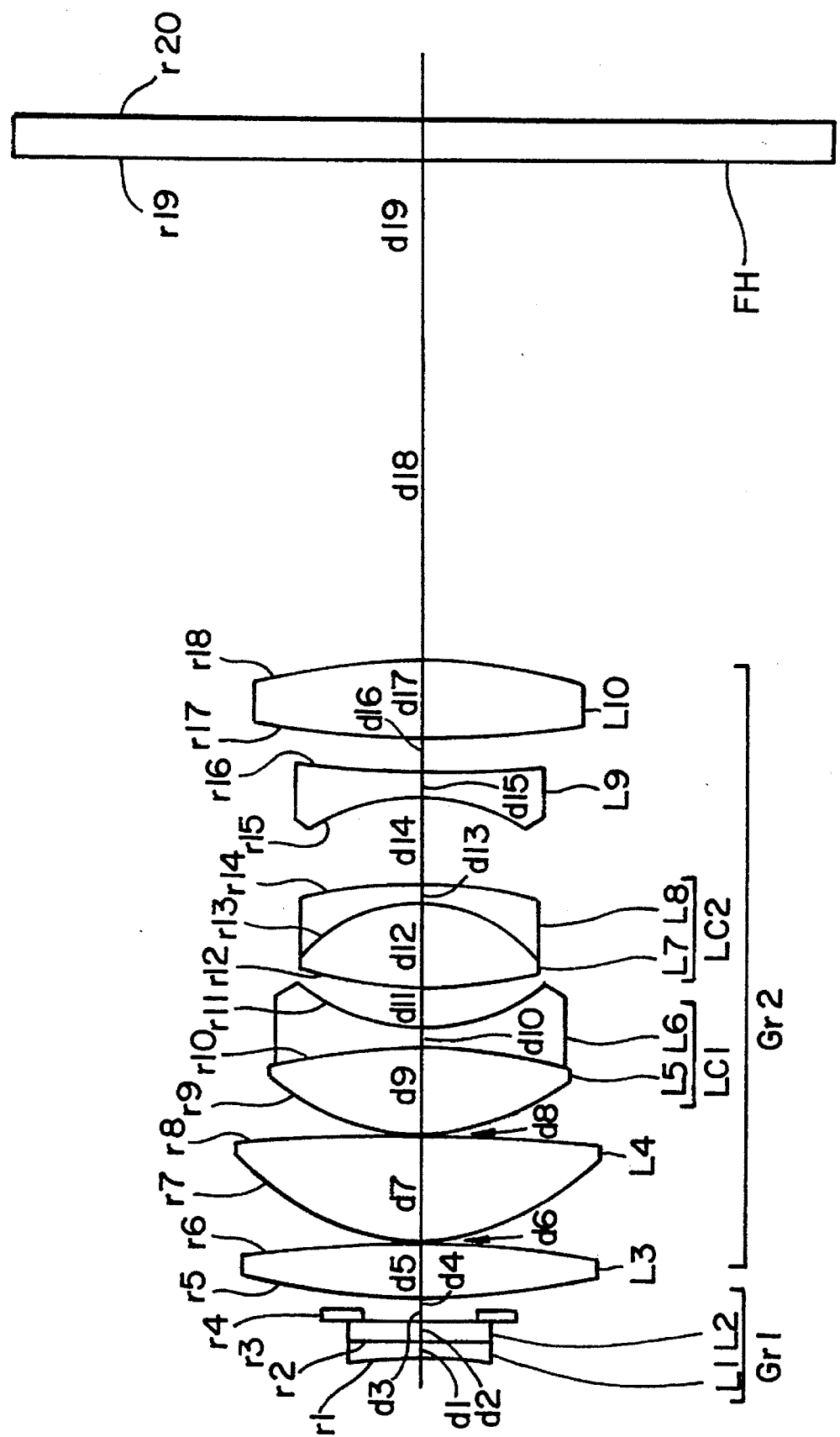
FIG. 4 is a section view showing the lens construction of a second embodiment.
Figure 5:
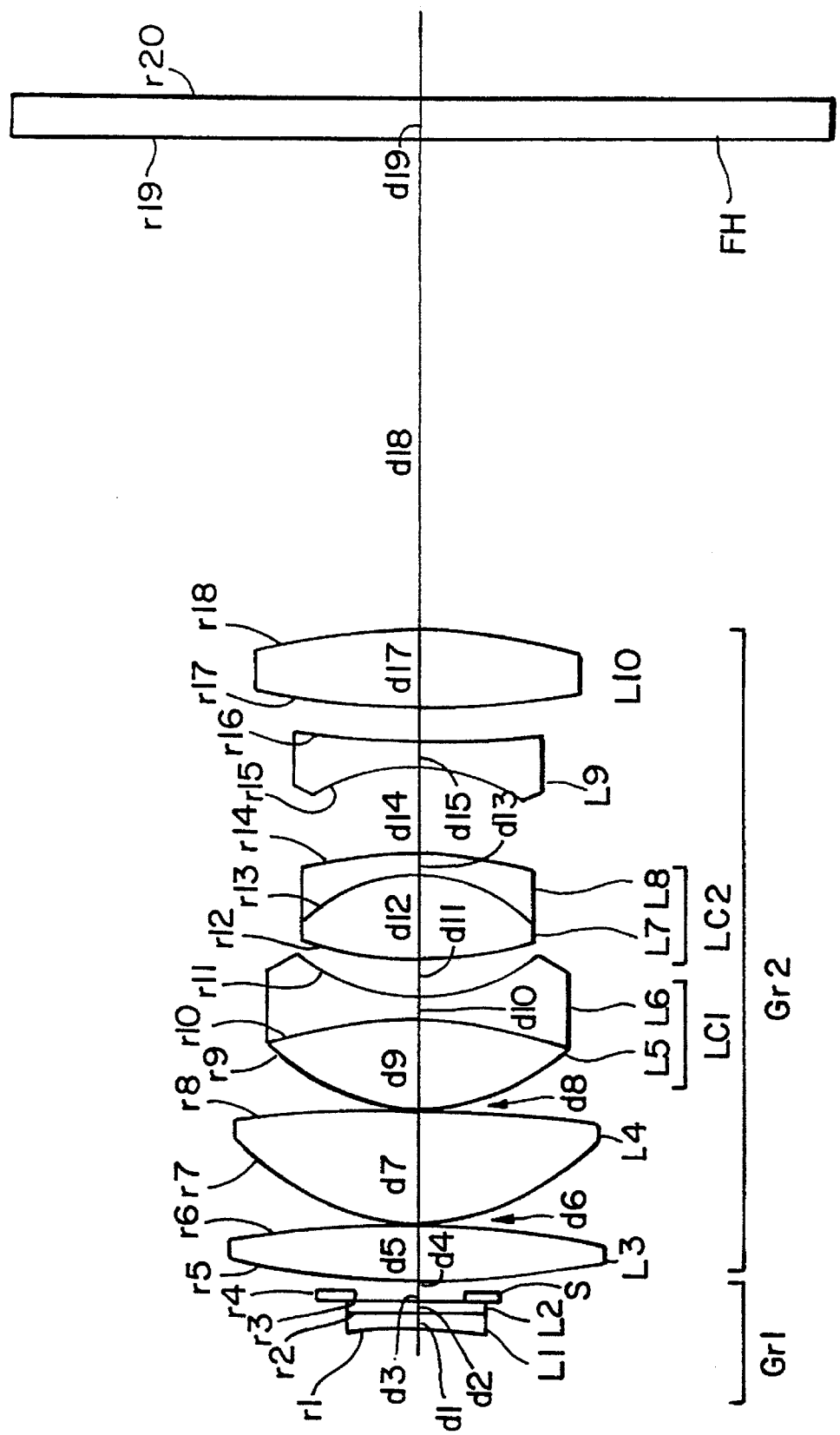
FIG. 5 is a section view showing the lens construction of a third embodiment.

As shown in FIG. 2, the finite conjugate distance zoom lens systems of the first through seventh embodiments comprise sequentially from the enlarging side first lens group Gr1 having negative refracting power, and second lens group Gr2 having positive refracting power. Regarding variable magnification during zooming from the maximum focal length state to the minimum focal length state, first lens group Gr1 shifts from the enlarging side to the reducing side during movement from the longest focal length state to an intermediate focal length state, and shifts from the reducing side to the enlarging side during movement from the intermediate focal length state to the shortest focal length state, whereas the second lens group Gr2 shifts discretely from the enlarging side to the reducing side. Regarding variable magnification from the maximum focal length state to the minimum focal length state when the zoom ratio is about 3, when the first lens group Gr1 shifts discretely to the reducing side, the spacing continually widens between the first lens group Gr1 and second lens group Gr2 until the minimum focal length state, such that the overall lens length is increased. A negative load is imposed on aberration correction by second lens group Gr2, thereby complicating the construction of first lens group Gr1. In the present embodiment, the aforesaid disadvantage is eliminated because first lens group Gr1 is not shifted discretely to the reducing side, but rather is shifted to the reducing side at the intermediate focal length state and shifted to the enlarging side on the minimum focal length state.

The first through seventh embodiments are described in detail below.

TABLE 1

First Embodiment f = 90~57.5~34.9
$F_{NO}$ = 11~7~4.2
$E_{xtp}$ = −64—−49—−63
nav1 − nav2 = 0.37
υ2a − υ2b = 32.6
Φ2/ΦL = 3.31
Φ2A/ΦL = 3.83

| | | |
|---|---|---|
| r1 = −39.41 | | |
| | d1 = 1.20  n1 = 1.6968 | υ1 = 56.5 |
| r2 = 160.65 | | |

TABLE 1-continued

First Embodiment

| | | |
|---|---|---|
| r3 = −633.51 | d2 = 1.06  n2 = 1.8052 | υ2 = 25.4 |
| | d3 = 0.45 | |
| r4 stop | | |
| | d4 = 1.00~11.90~31.44 | |
| r5 = 62.08 | | |
| | d5 = 3.92  n3 = 1.5014 | υ3 = 56.3 |
| r6 = −87.76 | | |
| | d6 = 0.30 | |
| r7 = 17.82 | | |
| | d7 = 7.80  n4 = 1.4952 | υ4 = 79.7 |
| r8 = −209.23 | | |
| | d8 = 0.20 | |
| r9 = 16.94 | | |
| | d9 = 6.50  n5 = 1.4983 | υ5 = 65.1 |
| r10 = −39.67 | | |
| | d10 = 1.52  n6 = 1.9135 | υ6 = 32.5 |
| r11 = 14.36 | | |
| | d11 = 2.68 | |
| r12 = 31.58 | | |
| | d12 = 6.00  n7 = 1.6734 | υ7 = 29.3 |
| r13 = −11.98 | | |
| | d13 = 1.58  n8 = 1.9326 | υ8 = 27.9 |
| r14 = −40.45 | | |
| | d14 = 6.25 | |
| r15 = −14.99 | | |
| | d15 = 1.99  n9 = 1.7725 | υ9 = 49.8 |
| r16 = 95.48 | | |
| | d16 = 2.38 | |
| r17 = 74.12 | | |
| | d17 = 5.68  n10 = 1.6734 | υ10 = 28.9 |
| r18 = −44.02 | | |
| | d18 = 36.06~15.85~3.81 | |
| r19 = ∞ | | |
| | d19 = 3.00  n11 = 1.5168 | υ11 = 64.2 |
| r20 = ∞ | | |

TABLE 2

Second Embodiment f = 90~57.4~34.8
$F_{NO}$ = 11~7~4
$E_{xtp}$ = −65—−50—−65
nav1 − nav2 = 0.38
υ2a − υ2b = 37.9
Φ2/ΦL = 3.28
Φ2A/ΦL = 3.84

| | | |
|---|---|---|
| r1 = −39.41 | | |
| | d1 = 1.20  n1 = 1.6968 | υ1 = 56.5 |
| r2 = 140.495 | | |
| | d2 = 1.54  n2 = 1.7985 | υ2 = 22.6 |
| r3 = −656.25 | | |
| | d3 = 0.45 | |
| r4 stop | | |
| | d4 = 1.00~12.01~31.76 | |
| r5 = 55.54 | | |
| | d5 = 3.92  n3 = 1.4875 | υ3 = 70.4 |
| r6 = −89.23 | | |
| | d6 = 0.30 | |
| r7 = 17.82 | | |
| | d7 = 7.50  n4 = 1.4875 | υ4 = 70.4 |
| r8 = −194.46 | | |
| | d8 = 0.20 | |
| r9 = 16.92 | | |
| | d9 = 6.50  n5 = 1.4875 | υ5 = 70.4 |
| r10 = −40.91 | | |
| | d10 = 1.52  n6 = 1.9135 | υ6 = 32.5 |
| r11 = 14.40 | | |
| | d11 = 2.68 | |
| r12 = 32.12 | | |
| | d12 = 6.00  n7 = 1.6813 | υ7 = 31.9 |
| r13 = −11.93 | | |
| | d13 = 1.58  n8 = 1.9135 | υ8 = 32.5 |
| r14 = −41.94 | | |
| | d14 = 6.23 | |
| r15 = −15.06 | | |

TABLE 2-continued

Second Embodiment

| | | | |
|---|---|---|---|
| r16 = 93.77 | d15 = 1.99 | n9 = 1.7725 | υ9 = 49.8 |
| r17 = 74.17 | d16 = 2.38 | | |
| r18 = −44.43 | d17 = 5.68 | n10 = 1.6734 | υ10 = 28.9 |
| r19 = ∞ | d18 = 36.64~16.30~4.17 | | |
| r20 = ∞ | d19 = 3.00 | n11 = 1.5168 | υ11 = 64.2 |

TABLE 3

Third Embodiment $f = 90~57.5~34.2$
$F_{NO} = 11~7~4.2$
$E_{xtp} = -64~-49~-60$
$nav1 - nav2 = 0.37$
$υ2a - υ2b = 32.6$
$Φ2/ΦL = 3.37$
$Φ2A/ΦL = 3.79$

| | | | |
|---|---|---|---|
| r1 = −39.41 | d1 = 1.20 | n1 = 1.7200 | υ1 = 54.7 |
| r2 = 178.40 | d2 = 0.85 | n2 = 1.7985 | υ2 = 22.6 |
| r3 = −446.62 | d3 = 0.45 | | |
| r4 stop | d4 = 1.00~11.52~30.35 | | |
| r5 = 71.47 | d5 = 3.92 | n3 = 1.5014 | υ3 = 56.3 |
| r6 = −87.91 | d6 = 0.30 | | |
| r7 = 17.82 | d7 = 7.80 | n4 = 1.4952 | υ4 = 79.7 |
| r8 = −163.34 | d8 = 0.23 | | |
| r9 = 16.30 | d9 = 6.50 | n5 = 1.4983 | υ5 = 65.1 |
| r10 = −37.88 | d10 = 1.52 | n6 = 1.9135 | υ6 = 32.5 |
| r11 = 14.36 | d11 = 2.68 | | |
| r12 = 30.85 | d12 = 6.00 | n7 = 1.6734 | υ7 = 29.3 |
| r13 = −12.05 | d13 = 1.58 | n8 = 1.9326 | υ8 = 27.9 |
| r14 = −40.12 | d14 = 6.34 | | |
| r15 = −14.76 | d15 = 1.99 | n9 = 1.7725 | υ9 = 49.8 |
| r16 = 89.95 | d16 = 2.40 | | |
| r17 = 74.66 | d17 = 5.68 | n10 = 1.6734 | υ10 = 28.9 |
| r18 = −44.00 | d18 = 36.03~15.79~3.74 | | |
| r19 = ∞ | d19 = 3.00 | n11 = 1.5168 | υ11 = 64.2 |
| r20 = ∞ | | | |

TABLE 4

Fourth Embodiment $f = 90~57.5~34.8$
$F_{NO} = 11~7~4.2$
$E_{xtp} = -65~-50~-65$
$nav1 - nav2 = 0.38$
$υ2a - υ2b = 54.8$
$Φ2/ΦL = 3.28$
$Φ2A/ΦL = 3.84$

| | | | |
|---|---|---|---|
| r1 = −42.99 | d1 = 1.20 | n1 = 1.6968 | υ1 = 56.5 |
| r2 = 94.57 | d2 = 1.60 | n2 = 1.8052 | υ2 = 25.4 |
| r3 = 1266.37 | d3 = 0.45 | | |
| r4 stop | | | |

TABLE 4-continued

Fourth Embodiment

| | | | |
|---|---|---|---|
| r5 = 76.63 | d4 = 1.00~12.02~31.77 | | |
| r6 = −110.81 | d5 = 4.50 | n3 = 1.5014 | υ3 = 56.3 |
| r7 = 44.63 | d6 = 0.30 | | |
| r8 = 150.37 | d7 = 2.80 | n4 = 1.4866 | υ4 = 84.5 |
| r9 = 20.16 | d8 = 0.09 | | |
| r10 = −231.43 | d9 = 7.50 | n5 = 1.4866 | υ5 = 84.5 |
| r11 = 19.08 | d10 = 0.22 | | |
| r12 = −65.23 | d11 = 6.30 | n6 = 1.4565 | υ6 = 90.8 |
| r13 = 14.16 | d12 = 3.32 | n7 = 1.9225 | υ7 = 36.0 |
| r14 = 33.03 | d13 = 2.73 | | |
| r15 = −12.91 | d14 = 7.42 | n8 = 1.6734 | υ8 = 29.3 |
| r16 = −60.47 | d15 = 2.00 | n9 = 1.9326 | υ9 = 27.9 |
| r17 = −17.11 | d16 = 6.50 | | |
| r18 = 223.26 | d17 = 2.00 | n10 = 1.7545 | υ10 = 51.6 |
| r19 = 80.08 | d18 = 1.65 | | |
| r20 = −43.21 | d19 = 6.00 | n11 = 1.6734 | υ11 = 29.3 |
| r21 = ∞ | d20 = 33.94~13.59~1.46 | | |
| r22 = ∞ | d21 = 3.00 | n12 = 1.5168 | υ12 = 64.2 |

TABLE 5

Fifth Embodiment $f = 90~57.4~34.8$
$F_{NO} = 11~7~4.2$
$E_{xtp} = -65~-50~-66$
$nav1 - nav2 = 0.38$
$υ2a - υ2b = 45.8$
$Φ2/ΦL = 3.28$
$Φ2A/ΦL = 3.86$

| | | | |
|---|---|---|---|
| r1 = −44.25 | d1 = 1.20 | n1 = 1.6968 | υ1 = 56.5 |
| r2 = 53.82 | d2 = 1.60 | n2 = 1.8074 | υ2 = 31.6 |
| r3 = 406.72 | d3 = 0.45 | | |
| r4 stop | d4 = 1.00~12.02~31.80 | | |
| r5 = 70.06 | d5 = 4.00 | n3 = 1.5014 | υ3 = 56.3 |
| r6 = −107.58 | d6 = 0.30 | | |
| r7 = 42.72 | d7 = 3.30 | n4 = 1.4866 | υ4 = 84.5 |
| r8 = 138.65 | d8 = 0.10 | | |
| r9 = 20.82 | d9 = 7.50 | n5 = 1.4861 | υ5 = 81.8 |
| r10 = −209.39 | d10 = 0.20 | | |
| r11 = 19.18 | d11 = 6.30 | n6 = 1.4861 | υ6 = 81.8 |
| r12 = −67.16 | d12 = 3.32 | n7 = 1.9225 | υ7 = 36.0 |
| r13 = 13.78 | d13 = 2.73 | | |
| r14 = 35.07 | d14 = 7.00 | n8 = 1.6165 | υ8 = 31.0 |
| r15 = −13.24 | d15 = 2.00 | n9 = 1.9326 | υ9 = 27.9 |

TABLE 5-continued

Fifth Embodiment

| r16 = −49.63 | | | |
|---|---|---|---|
| | d16 = 6.50 | | |
| r17 = −17.31 | | | |
| | d17 = 2.00 | n10 = 1.7550 | υ10 = 52.3 |
| r18 = 334.81 | | | |
| | d18 = 1.65 | | |
| r19 = 84.15 | | | |
| | d19 = 6.00 | n11 = 1.6734 | υ11 = 28.9 |
| r20 = −41.77 | | | |
| | d20 = 32.90~12.54~0.41 | | |
| r21 = ∞ | | | |
| | d21 = 3.00 | n12 = 1.5168 | υ12 = 64.2 |
| r22 = ∞ | | | |

TABLE 6

Sixth Embodiment

| f = 90~57.5~34.9 | | nav1 − nav2 = 0.38 | |
|---|---|---|---|
| $F_{NO}$ = 11~7~4.3 | | υ2a − υ2b = 58.3 | |
| $E_{xtp}$ = −64—−56—−76 | | Φ2/ΦL = 3.36 | |
| | | Φ2A/ΦL = 3.71 | |
| r1 stop | | | |
| | d1 = 1.00~10.26~2.98 | | |
| r2 = −42.17 | | | |
| | d2 = 1.02 | n1 = 1.6968 | υ1 = 56.5 |
| r3 = 78.08 | | | |
| | d3 = 1.60 | n2 = 1.8052 | υ2 = 25.4 |
| r4 = 1424.70 | | | |
| | d4 = 1.45~12.15~31.33 | | |
| r5 = 59.30 | | | |
| | d5 = 4.50 | n3 = 1.5014 | υ3 = 56.3 |
| r6 = −115.27 | | | |
| | d6 = 0.30 | | |
| r7 = 46.96 | | | |
| | d7 = 2.80 | n4 = 1.4866 | υ4 = 84.5 |
| r8 = 211.62 | | | |
| | d8 = 0.85 | | |
| r9 = 21.76 | | | |
| | d9 = 9.14 | n5 = 1.4565 | υ5 = 90.8 |
| r10 = −196.20 | | | |
| | d10 = 0.24 | | |
| r11 = 19.28 | | | |
| | d11 = 6.31 | n6 = 1.4565 | υ6 = 90.8 |
| r12 = −65.23 | | | |
| | d12 = 3.36 | n7 = 1.9135 | υ7 = 32.5 |
| r13 = 14.38 | | | |
| | d13 = 2.73 | | |
| r14 = 34.02 | | | |
| | d14 = 7.42 | n8 = 1.6734 | υ8 = 29.3 |
| r15 = −14.17 | | | |
| | d15 = 1.67 | n9 = 1.9135 | υ9 = 32.5 |
| r16 = −73.80 | | | |
| | d16 = 5.21 | | |
| r17 = −17.11 | | | |
| | d17 = 1.10 | n10 = 1.7550 | υ10 = 52.3 |
| r18 = 194.80 | | | |
| | d18 = 1.34 | | |
| r19 = 78.78 | | | |
| | d19 = 5.50 | n11 = 1.6734 | υ11 = 29.3 |
| r20 = −40.85 | | | |
| | d20 = 34.65~14.68~2.79 | | |
| r21 = ∞ | | | |
| | d21 = 3.00 | n12 = 1.5168 | υ12 = 64.2 |
| r22 = ∞ | | | |

TABLE 7

Seventh Embodiment

| f = 90~57.6~35.0 | nav1 − nav2 = 0.37 |
|---|---|
| $F_{NO}$ = 11~7~4.3 | υ2a − υ2b = 28.0 |
| $E_{xtp}$ = −63—−54—−69 | Φ2/ΦL = 3.42 |
| | Φ2A/ΦL = 3.78 |

TABLE 7-continued

Seventh Embodiment

| r1 stop | | | |
|---|---|---|---|
| | d1 = 1.00~10.17~3.07 | | |
| r2 = −41.22 | | | |
| | d2 = 1.02 | n1 = 1.6968 | υ1 = 56.5 |
| r3 = 163.90 | | | |
| | d3 = 1.50 | n2 = 1.8052 | υ2 = 25.4 |
| r4 = −1462.91 | | | |
| | d4 = 1.45~11.96~30.77 | | |
| r5 = 49.59 | | | |
| | d5 = 3.92 | n3 = 1.5014 | υ3 = 56.3 |
| r6 = −159.43 | | | |
| | d6 = 0.30 | | |
| r7 = 18.45 | | | |
| | d7 = 7.71 | n4 = 1.4952 | υ4 = 79.7 |
| r8 = −136.52 | | | |
| | d8 = 0.27 | | |
| r9 = 16.88 | | | |
| | d9 = 6.50 | n5 = 1.5111 | υ5 = 60.5 |
| r10 = −39.45 | | | |
| | d10 = 1.52 | n6 = 1.9135 | υ6 = 32.5 |
| r11 = 14.35 | | | |
| | d11 = 2.68 | | |
| r12 = 30.88 | | | |
| | d12 = 6.00 | n7 = 1.6734 | υ7 = 28.9 |
| r13 = −11.95 | | | |
| | d13 = 2.33 | n8 = 1.9326 | υ8 = 27.9 |
| r14 = −41.11 | | | |
| | d14 = 5.50 | | |
| r15 = −14.95 | | | |
| | d15 = 1.16 | n9 = 1.7550 | υ9 = 52.3 |
| r16 = 95.66 | | | |
| | d16 = 1.27 | | |
| r17 = 73.40 | | | |
| | d17 = 5.45 | n10 = 1.6734 | υ10 = 28.9 |
| r18 = −48.85 | | | |
| | d18 = 37.75~18.07~6.36 | | |
| r19 = ∞ | | | |
| | d19 = 3.00 | n11 = 1.5168 | υ11 = 64.2 |
| r20 = −∞ | | | |

In tables 1~7, ri (i=1, 2, . . . ) represents the radius of curvature of the surface of lens number "i" counting from the enlarging side; di (i=1, 2, . . . ) represents the axial distance (spacing) "i" from the enlarging side; ni (i=1, 2, . . .) represents the refractive index relative to line d of lens number "i" from the enlarging side; and vi (i=1, 2, . . . ) represents the Abbe number of lens number "i" from the enlarging side. The refractive index between lenses is 1.00. Furthermore, f refers to the focal length of the zoom lens; $F_{NO}$ refers to the F number of the zoom lens; $E_{xtp}$ refers to distance from the first lens surface to the exit pupil. The aforesaid factors f, $F_{NO}$, and $E_{xtp}$, are sequential numerical values at the maximum focal length state (magnification β=−1/9), intermediate focal length state (magnification β=−1/16), and minimum focal length state (magnification β=−1/27). These reference symbols are described in detail later.

FIGS. 3~9 show the maximum focal length states of the finite conjugate distance zoom lens systems of the first through seventh embodiments. The first through third embodiments are described hereinafter with reference to FIGS. 3~5.

First lens group Gr1 of the first through third embodiments consists of sequentially from the enlarging side biconcave lens L1, biconvex lens L2, and stop S. Biconcave lens L1 and biconvex lens L2 are cemented lenses. Second lens group Gr2 consists of sequentially from the enlarging side biconvex lenses L3 and L4, first cemented lens Lc1 incorporating biconvex lens L5 and biconcave lens L6, second cemented lens Lc2 incorporating biconvex lens L7 and negative meniscus lens L8 confronting a concave surface on the enlarging side, biconcave lens L9, and biconvex lens L10. Reference symbol FH in the drawing, refers to a film holder for supporting the microfilm.

Figure 6:
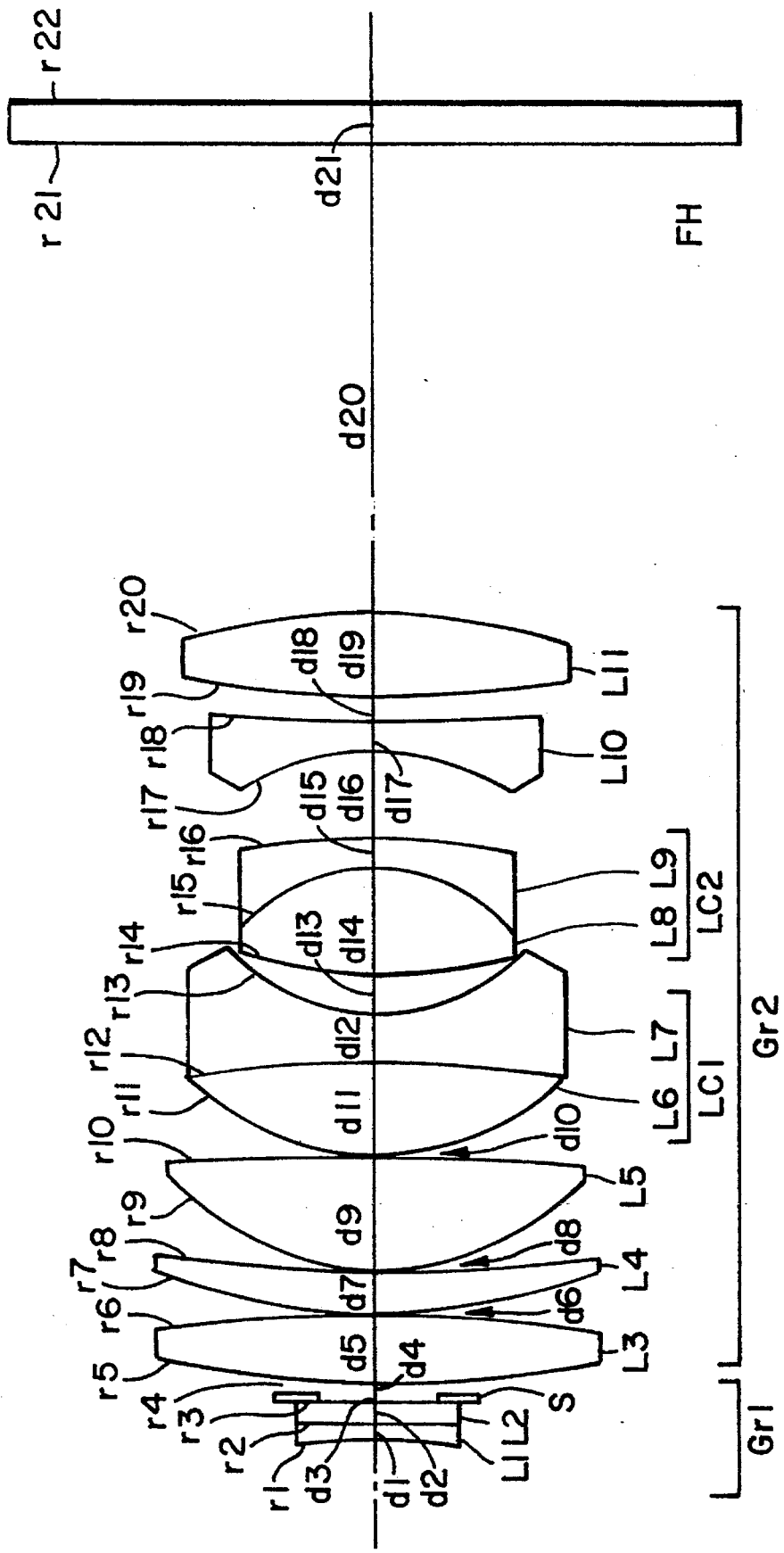
FIG. 6 is a section view showing the lens construction of a fourth embodiment.
Figure 7:
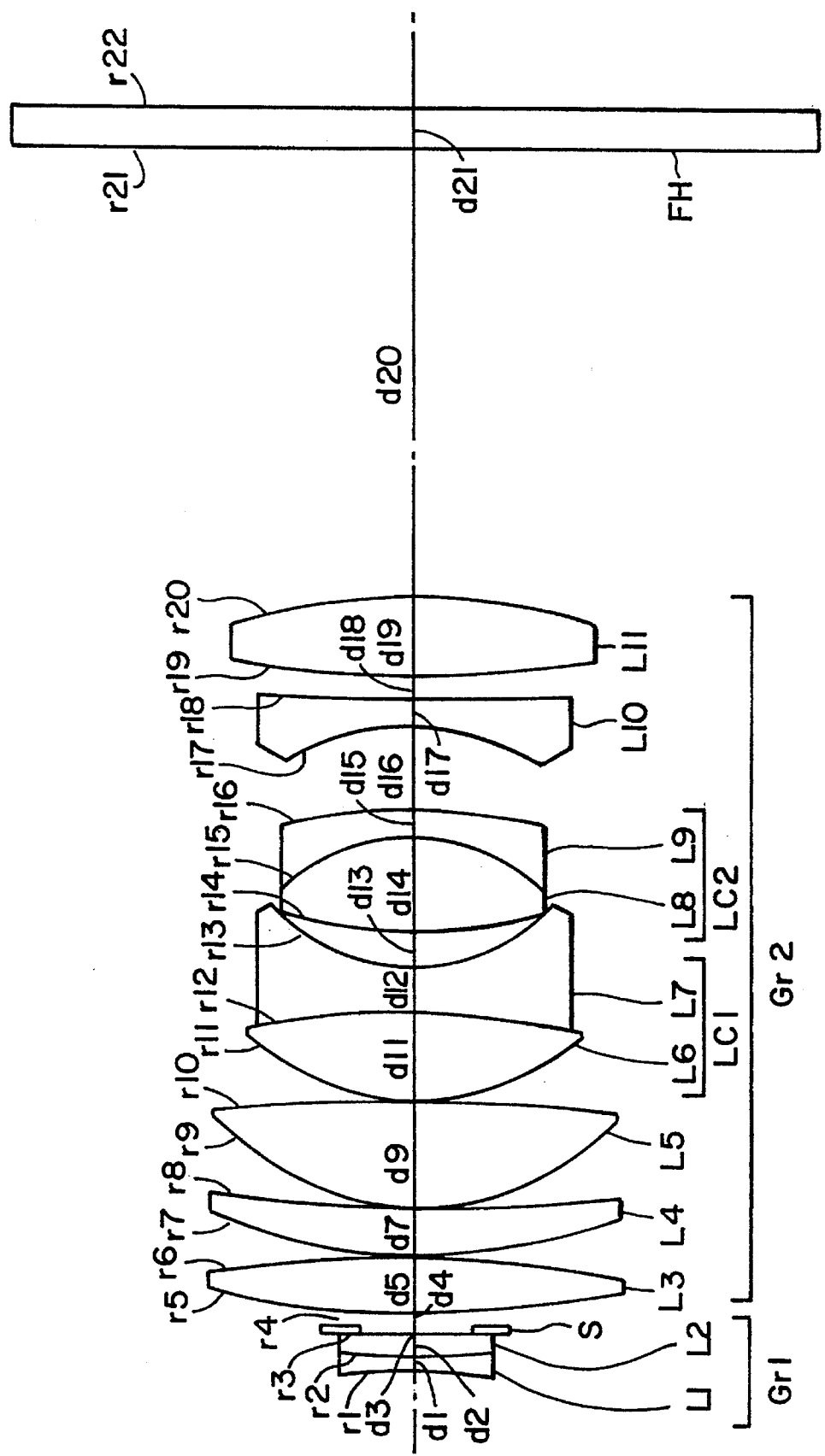
FIG. 7 is a section view showing the lens construction of a fifth embodiment.

FIGS. 6 and 7 show fourth and fifth embodiments. In these embodiments, first lens group Gr1 consists of sequentially from the enlarging side biconcave lens L1, positive meniscus lens L2 confronting a convex surface on the enlarging side, and stop S. Biconcave lens L1 and positive meniscus lens L2 are cemented lenses. Second lens group Gr2 consists of sequentially from the enlarging side biconvex lens L3, positive meniscus lens L4 confronting a convex surface on the enlarging side, biconvex lens L5, and first cemented lens Lc1 incorporating biconvex lens L6 and biconcave lens L7, and second cemented lens Lc2 incorporating biconvex lens L8 and negative meniscus lens L9 confronting a concave surface on the enlarging side, and further consisting of biconcave lens L10, and biconvex lens L11.

Figure 8:
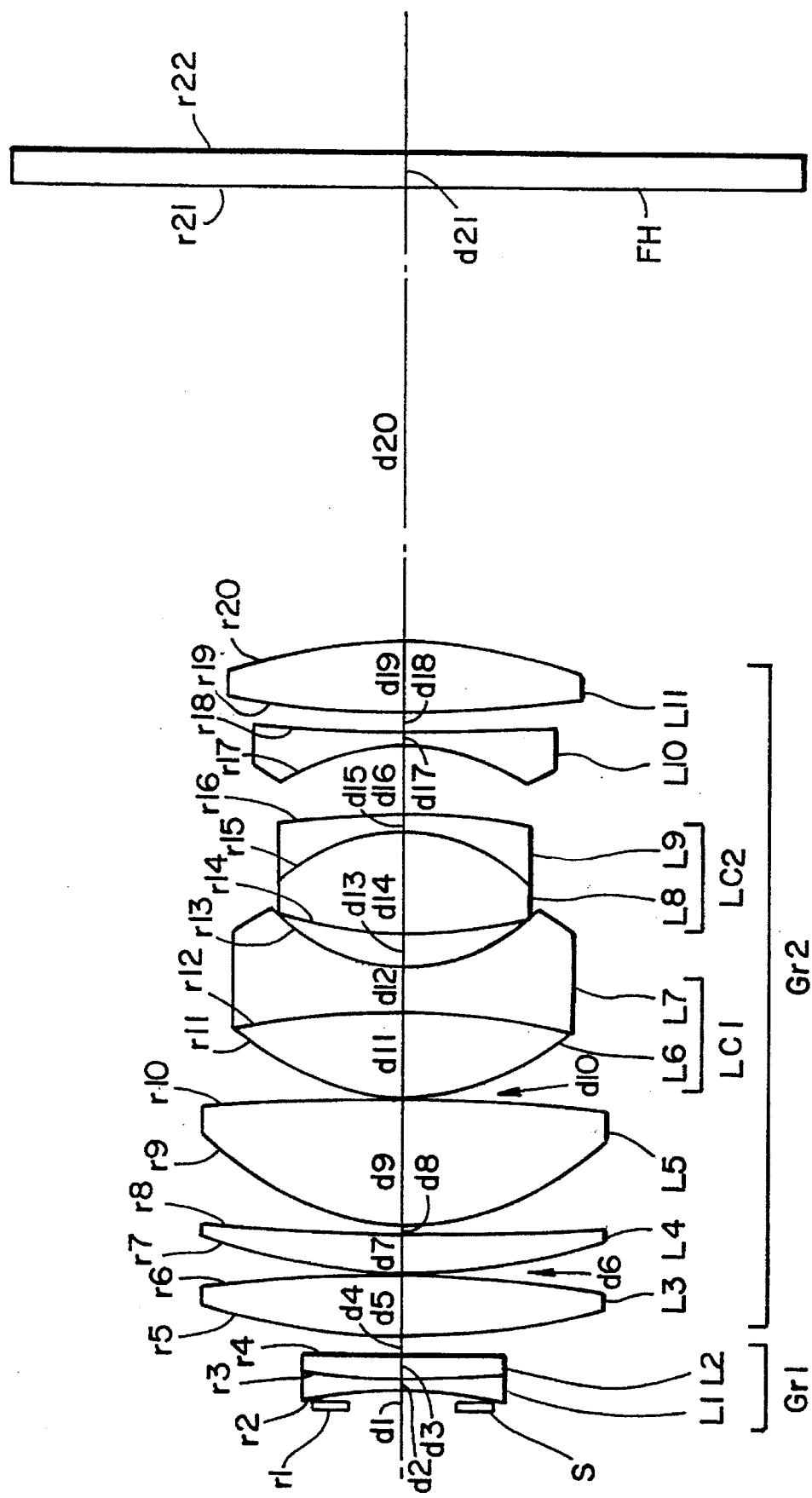
FIG. 8 is a section view showing the lens construction of a sixth embodiment.

FIG. 8 shows a sixth embodiment. In the sixth embodiment, first lens group Gr1 consists of a cemented lens incorporating biconcave lens L1, and positive meniscus lens L2 confronting a convex surface on the enlarging side. Second lens group Gr2 consists of sequentially from the enlarging side biconvex lens L3, positive meniscus lens L4 confronting a convex surface on the enlarging side, biconvex lens L5, first cemented lens Lc1 incorporating biconvex lens L6 and biconcave lens L7, second cemented lens Lc2 incorporating biconvex lens L8 and negative meniscus lens L9 confronting a concave surface on the enlarging side, and further consisting of biconcave lens L10, and biconvex lens L11.

Figure 9:
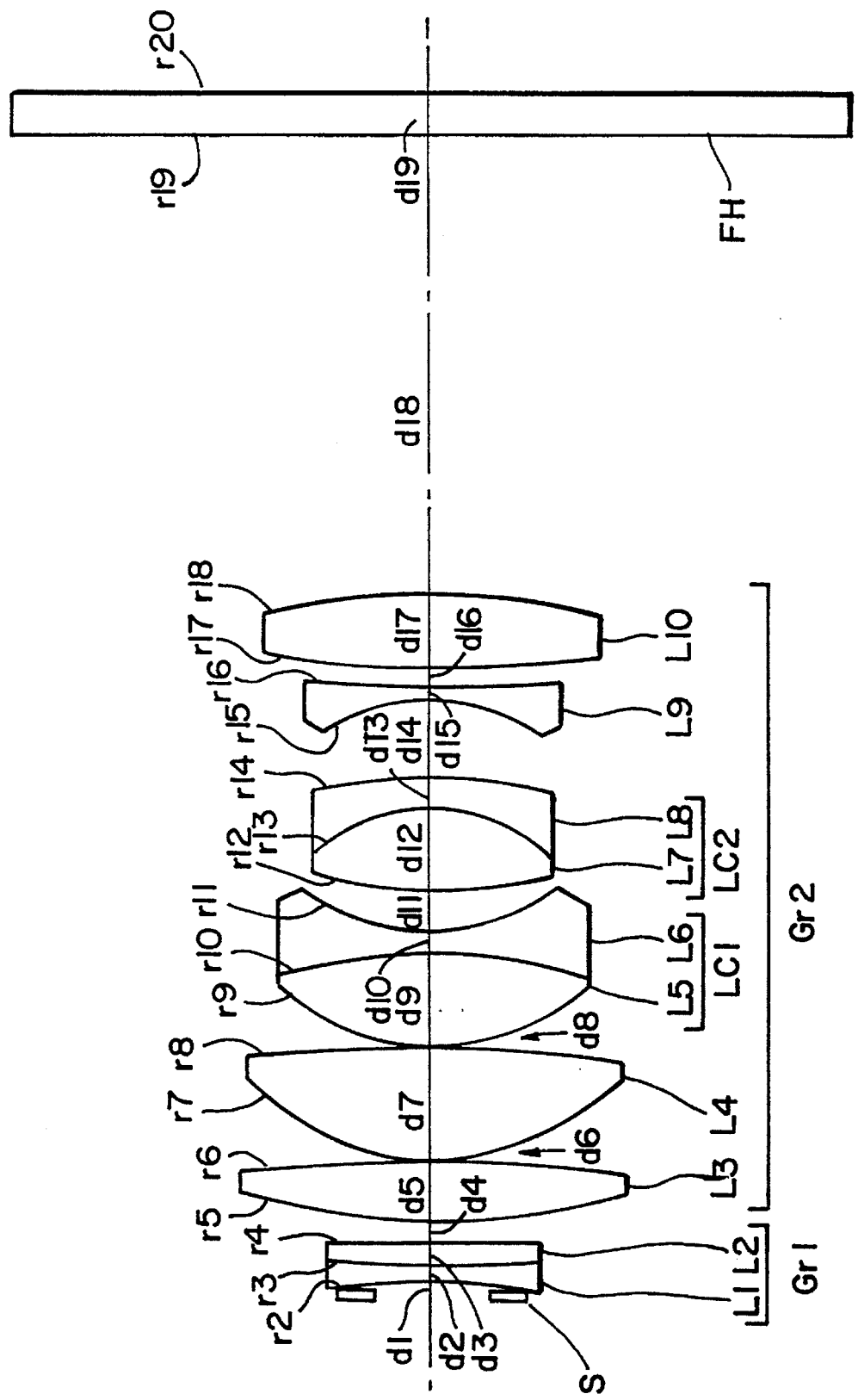
FIG. 9 is a section view showing the lens construction of a seventh embodiment.
Figure 10A:
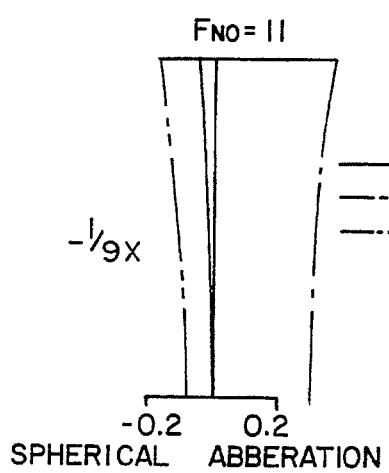
FIGS. 10A–10I are aberration curves of the first embodiment.
Figure 10B:
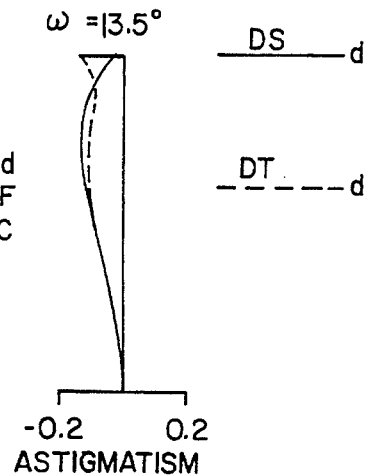
Figure 10C:
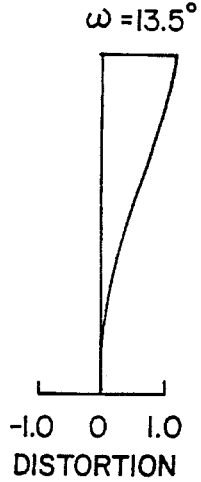
Figure 10D:
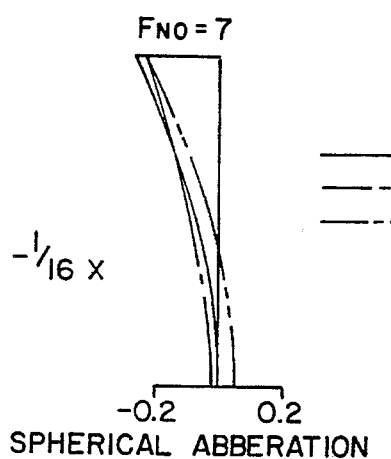
Figure 10E:
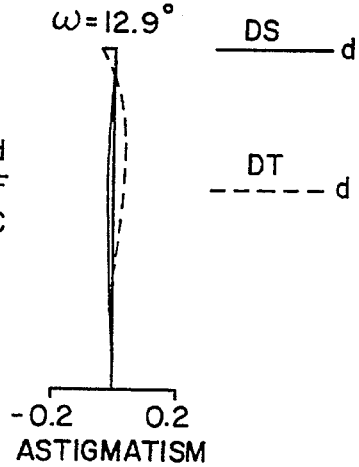
Figure 10F:
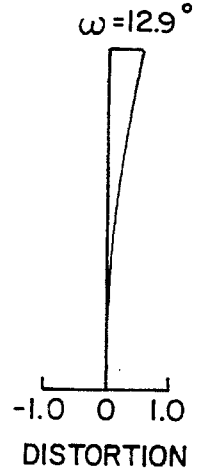
Figure 10G:
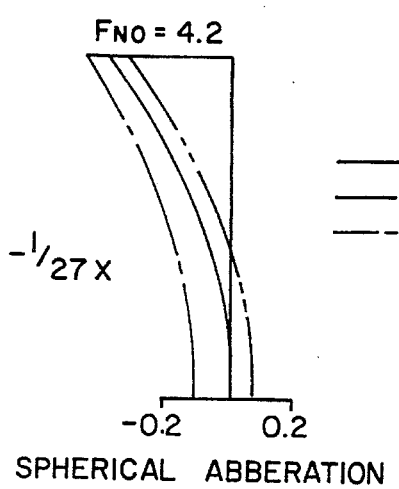
Figure 10H:
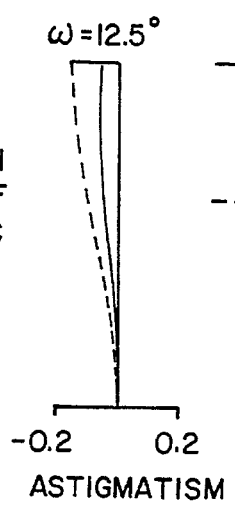
Figure 10I:
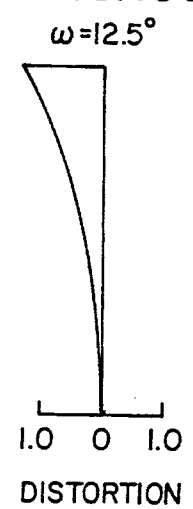
Figure 16A:
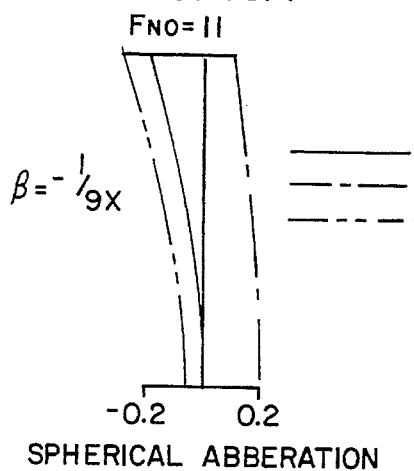
FIGS. 16A–16I are aberration curves of the seventh embodiment.
Figure 16B:
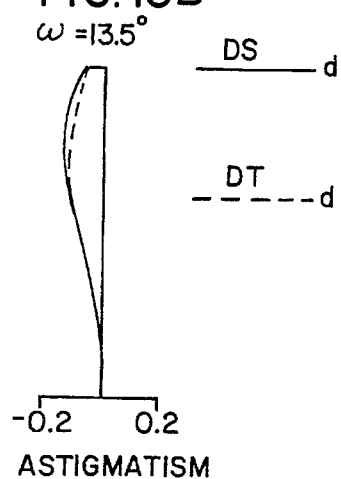
Figure 16C:
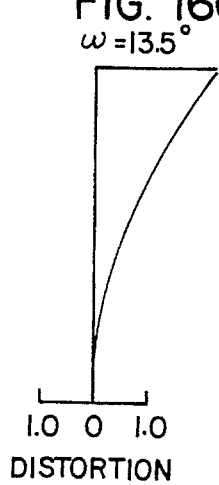
Figure 16D:
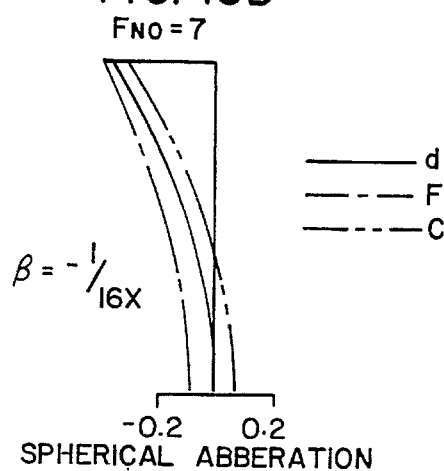
Figure 16E:
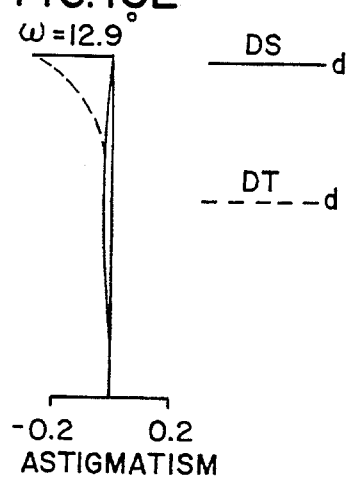
Figure 16F:
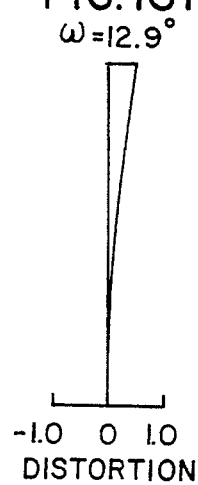
Figure 16G:
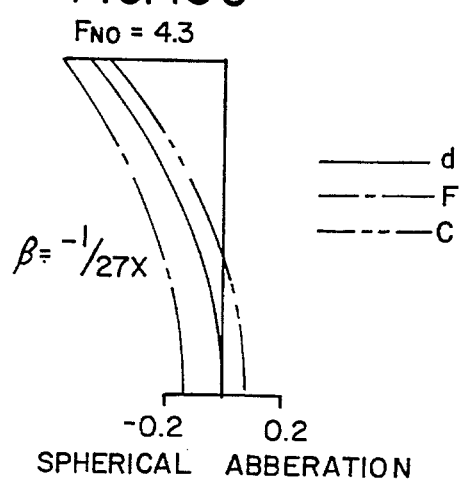
Figure 16H:
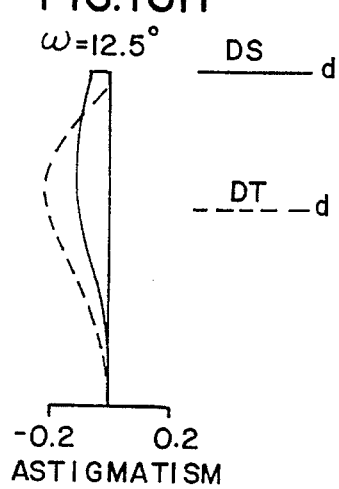
Figure 16I:
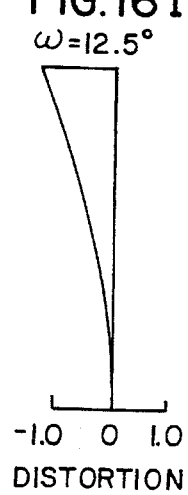

FIG. 9 shows a seventh embodiment. In the seventh embodiment, first lens group Gr1 consists of a cemented lens incorporating biconcave lens L1 and biconvex lens L2. Second lens group Gr2 consists of sequentially from the enlarging side biconvex lens L3, biconvex lens L4, first cemented lens Lc1 incorporating biconvex lens L5 and biconcave lens L6, second cemented lens Lc2 incorporating biconvex lens L7 and negative meniscus lens L8 confronting a concave surface on the enlarging side, and further consisting of biconcave lens L9, and biconvex lens L10.

Although two cemented lenses are used in the example of the present embodiment, color aberration correction is possible even when the biconvex lens and negative lens of second cemented lens Lc2 are not cemented if the refractive indices of the biconvex lens and negative lens of first cemented lens Lc1 are set as described below.

The zoom lens system of the present embodiment utilizes a telephoto type lens having two positive and negative components as the second lens group Gr2, providing a strong positive refractive index on the enlarging side of second lens group Gr2 by disposing at least two positive lenses on the enlarging side of second lens group Gr2 (i.e., on the enlarging side of first cemented lens Lc1), thereby reducing the overall length of the lens. When the positive refracting power is weak on the enlarging side of second lens group Gr2, the zoom ratio increases and the overall lens length is increased. Furthermore, the off-axial ray entrance position on the reducing side of the aforesaid positive lenses becomes widely separated, such that correcting aberration generated by the lenses on the reducing side of said positive lenses becomes difficult. Although a strong positive refracting power is required for the second lens group Gr2, thereby increasing the diameter of the lenses on the reducing side of the aforesaid positive lenses, obtaining adequate refracting power by means of only a single positive lens and a positive lens of first cemented lens Lc1 requires that the curvature of each lens surface be increased, thereby increasing the amount of generated spherical aberration. In the present embodiment, at least two positive lenses are provided on the enlarging side of first cemented lens Lc1, such that the curvature of the surfaces of the lenses is not extremely great and the required refracting power is obtained without generating spherical aberration. Although spherical aberration is generated which is under-corrected by the strong positive refracting power on the enlarging side of second lens group Gr2, the refracting power of the cemented surface of first cemented lens Lc1 is negative (the cemented surface confronts a concave surface on the enlarging side), such that the refractive index of the negative lenses of the first cemented lens Lc1 is greater than the refractive index of the biconvex lens of first cemented lens Lc1, thereby correcting the aforesaid spherical aberration.

The first through seventh embodiments are provided with second cemented lens Lc2 on the reducing side of first cemented lens Lc1 to provide excellent correction of magnification chromatic aberration which increases as the zoom ratio increases, and provide excellent correction of curvature of field caused by first cemented lens Lc1 by satisfying the following conditions (1) and (2).

$$n2a < n2b \tag{1}$$

$$n2c < n2d \tag{2}$$

Wherein the following definitions obtain:

n2a: refractive index of biconvex lens of first cemented lens Lc1 n2b: refractive index of negative lens of first cemented lens Lc1 n2c: refractive index of biconvex lens of second cemented lens Lc2 n2d: refractive index of negative lens of second cemented lens Lc2

In the cemented lenses of the present embodiment, the ability to correct chromatic aberration is increased as the difference between the refractive indices of the positive lenses and negative lenses becomes greater. When the zoom ratio becomes larger, the amount of magnification chromatic aberration generated in the maximum focal length state and minimum focal length state become extremely large, such that chromatic aberration cannot be adequately corrected by a single cemented lens even when the difference between the refractive indices of the positive and negative lenses of said cemented lens is large. Thus, in the present embodiment, a second cemented lens Lc2 is provided on the reducing side of first cemented lens Lc1 so as to render the refractive index of the negative lens greater than the refractive index of the biconvex lens in second cemented lens Lc2, and thereby also correct the chromatic aberration produced by second cemented lens Lc2.

Accordingly, chromatic aberration correction capability can be increased by providing two cemented lenses comprising a biconvex lens and negative lens in second lens group Gr2. In such circumstances, correction of chromatic aberration abundantly produced at the maximum focal length state and minimum focal length state is excellent even at large zoom ratios.

The entrance position of the extra-axial rays entering the reducing side of the lens from the biconvex lens does not separate from the optical path due to the positive refracting power of said biconvex lens of second cemented lens Lc2, such that aberration correction is easily accomplished by the lens on the reducing side of said biconvex lens. Furthermore, when at least a single negative lens confronting a concave surface on the enlarging side is provided on the reducing side of second cemented lens Lc2, curvature of field is corrected by said negative lens.

Providing a positive lens on the first reducing side of second lens group Gr2 causes the pupil position on the reducing side to be separated from the image plane, such that the lens diameter of the illumination optical system disposed on the reducing side of the zoom lens system can be rendered more compact.

In the first through third and seventh embodiments, when the second lens group Gr2 consists of sequentially from the enlarging side two positive lenses, first and second cemented lenses incorporating a biconvex lens and negative lens, negative lens confronting a concave surface on the enlarging side, and positive lens, it is desirable that the following conditions (3)~(5) are fulfilled.

$$0.35 < nav1 - nav2 < 0.4 \quad (3)$$

$$3.0 < \Phi2/\Phi L < 3.5 \quad (4)$$

$$25 < v2a - v2b < 40 \quad (5)$$

Wherein the following definitions obtain:

nav1: mean value of refractive indices of negative lenses L6, L8, L9 on the reducing side of the biconvex lens of first cemented lens Lc1 nav2: mean value of refractive indices of positive lenses L3, L4 on the enlarging side of first cemented lens Lc1

Φ2: refracting power of second lens group Gr2

ΦL: refracting power of overall system at maximum focal length state v2a: Abbe number of biconvex lens of first cemented lens Lc1 v2b: Abbe number of negative lens of first cemented lens Lc1

Condition (3) is a formula for excellent correction of curvature of field. When the upper limit of the condition is exceeded, curvature of field is over-corrected. When the lower limit is exceeded, curvature of field is under-corrected.

Condition (4) defines the refracting power of second lens group Gr2. When the upper limit of the condition is exceeded, various aberrations generated by second lens group Gr2 are excessively increased, making correction of said aberration by first lens group Gr1 difficult. When the lower limit is exceeded, total length is increased, making it difficult to achieve system compactness.

Conditional (5) relates to dispersion of the cemented lens within second lens group Gr2. When the upper limit of the condition is exceeded, magnification chromatic aberration increases in a positive direction, and magnification chromatic aberration is particularly increased at the maximum focal length state. When the lower limit is exceeded, magnification chromatic aberration is increased in a negative direction, and magnification chromatic aberration correction is particularly difficult at the minimum focal length state.

In the fourth through sixth embodiments, when the second lens group Gr2 consists of sequentially from the enlarging side three positive lenses, two cemented lenses incorporating a biconvex lens and negative lens, negative lens position adjacent a concave surface on the enlarging side, and positive lens, it is desirable that the following conditions (6)~(8) are satisfied. satisfied.

$$0.35 < nav1 - nav2 < 0.4 \quad (6)$$

$$3.0 < \Phi2/\Phi L < 3.5 \quad (7)$$

$$40 < v2c - v2d < 60 \quad (8)$$

Wherein the following definitions obtain:

nav1: mean value of refractive indices of negative lenses L7, L9, L10 on the reducing side of the biconvex lens of first cemented lens Lc1 nav2: mean value of refractive indices of positive lenses L3, L4, L5 on the enlarging side of first cemented lens Lc1

Φ2: refracting power of second lens group Gr2

ΦL: refracting power of overall system at maximum focal length state v2c: Abbe's number of biconvex lens of first cemented lens Lc1 v2d: Abbe's number of negative lens of first cemented lens Lc1

Condition (6) is a formula for excellent correction of curvature of field. When the upper limit of the formula equation is exceeded, curvature of field is over-corrected. When the lower limit is exceeded, curvature of field is under-corrected.

Condition (7) defines the refracting power of second lens group Gr2. When the upper limit of the condition is exceeded, various aberrations generated by second lens group Gr2 are excessively increased, making correction of said aberration by first lens group Gr1 difficult. When the lower limit is exceeded, total length is increased, making it difficult to achieve system compactness.

Condition (8) relates to dispersion of the first cemented lens Lc1. When the upper limit of the condition is exceeded, magnification chromatic aberration increases in a positive direction, and magnification chromatic aberration is particularly increased at the maximum focal length state. When the lower limit is exceeded, magnification chromatic aberration is increased in a negative direction, and magnification chromatic aberration correction is particularly difficult at the minimum focal length state.

In the first through seventh embodiments, it is desirable that the following condition (9) is satisfied.

$$3.5 < \Phi2A/\Phi L < 4.0 \quad (9)$$

Wherein the following definitions obtain:

Φ2A: total refracting power of positive lenses on the enlarging side of first cemented lens Lc1 (lenses L3 and L4 in first through third and seventh embodiments; lenses L3, L4, L5 in fourth through sixth embodiments)

ΦL: total refracting power at maximum focal length state

Condition (9) stipulates the total refracting power of at least two positive lenses provided on the enlarging side of first cemented lens Lc1. When the upper limit of the condition is exceeded, positive refracting power on the enlarging side of second lens group Gr2 becomes excessively large, thereby increasing the generation of various aberrations and particularly spherical aberration, and making it difficult to correct said aberration by lenses on the reducing side of first cemented lens Lc1. Spherical aberration correction is especially inadequate. When the lower limit is exceeded, aberration generated by lenses on the reducing side of first cemented lens Lc1 increases due to increased separation of the off-axial ray entrance position to the lenses on the reducing side of first cemented lens Lc1. Aberration generation increases particularly at the minimum focal length state. Furthermore, overall lens length is increased, making impossible to achieve lens compactness.

The first through third and seventh embodiments fulfill conditions (1)~(5) and (9).

The fourth through sixth embodiments fulfill conditions (1)~(2), and (6)~(9).

The correspondence between values of n2a, n2b, n2c, n2d, ν2a, ν2b, ν2c, ν2 d of the various conditional equations and the first through seventh embodiments are shown below in Table 8.

TABLE 8

|      | Emb. 1 | Emb. 2 | Emb. 3 | Emb. 4 | Emb. 5 | Emb. 7 | Emb. 8 |
|------|--------|--------|--------|--------|--------|--------|--------|
| n2a  | n5     | n5     | n5     | n6     | n6     | n6     | n5     |
| n2b  | n6     | n6     | n6     | n7     | n7     | n7     | n6     |
| n2c  | n7     | n7     | n7     | n8     | n8     | n8     | n7     |
| n2d  | n8     | n8     | n8     | n9     | n9     | n9     | n8     |
| ν2a  | ν5     | ν5     | ν5     | —      | —      | —      | ν5     |
| ν2b  | ν6     | ν6     | ν6     | —      | —      | —      | ν6     |
| ν2c  | —      | —      | —      | ν6     | ν6     | ν6     | —      |
| ν2d  | —      | —      | —      | ν7     | ν7     | ν7     | —      |

In the first through seventh embodiments, it is desirable that the first lens group Gr1 consists of cemented lens. By the construction chromatic aberration is corrected more excellently. Furthermore it is desirable that an aperture stop be provided in the vicinity of first lens group Gr1 and said stop be moved integratedly with the first lens group Gr1 during variable magnification. By the aforesaid construction, aberration generation can be suppressed when first lens group Gr1 and second lens group Gr2 are separated during variable magnification.

In the sixth and seventh embodiments, an aperture stop is provided on the enlarging side of first lens group Gr1 to reduce the field angle near first lens group Gr1, so as to make a compact image rotation prism possible.

FIGS. 10–16 show the aberration curves of the first through seventh embodiments. In the various illustrations, the upper level shows aberration curves at the maximum focal length state ($\beta = -1/9$), the intermediate level shows the aberration curves at the intermediate focal length state ($\beta = -1/16$), and the bottom level shows the aberration curves at the minimum focal length state ($\beta = -1/27$). In the spherical aberration drawings, solid line (d), single dashed line (F), and double dashed line (C) respectively indicate spherical aberration of d-line, F-line, and C-line. In the astigmatism drawings, solid line (DS), and broken line (DT) respectively indicate astigmatism of the sagittal plane and tangential plane.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A finite conjugate distance zoom lens system comprising sequentially from the enlarging side a first lens group having a negative refracting power, and a second lens group having a positive refracting power, wherein zooming from a maximum focal length state to a minimum focal length state is accomplished by individually shifting said first lens group from the enlarging side to the reducing side and then shifting from the reducing side to the enlarging side to reach the minimum focal length state, while shifting said second lens group from the enlarging side to the reducing side, said second lens group comprises sequentially from the enlarging side at least two positive lens elements, first and second cemented lenses both of which consist of a cemented biconvex lens element and a negative lens element, a negative lens element having a concave surface on the enlarging side, and a positive lens element, and wherein the following conditions are fulfilled:

n2a<n2b n2c<n2d where n2a represents a refractive index of said biconvex lens element of said first cemented lens, n2b represents a refractive index of said negative lens element of said first cemented lens, n2c represents a refractive index of said biconvex lens element of said second cemented lens, and n2d represents a refractive index of said negative lens element of said second cemented lens.

2. A finite conjugate distance zoom lens system according to claim 1, wherein the following condition is further fulfilled:

0.35<nav1−nav2<0.4 where nav1 represents a mean value of refractive indices of negative lens elements on the reducing side of said biconvex lens element of said first cemented lens in said second lens group, and nav2 represents a mean value of refractive indices of positive lens elements on the enlarging side of said first cemented lens in said second lens group.

3. A finite conjugate distance zoom lens system according to claim 1, wherein the following condition is further fulfilled:

3.0<φ2/φL<3.5 where φ2 represents a refracting power of said second lens group, and φL represents a refracting power of the overall lens system at a maximum focal length state.

4. A finite conjugate distance zoom lens system according to claim 1, wherein the following condition is further fulfilled:

3.5<φ2A/φL<4.0 where φ2A represents a total refracting power of the positive lens elements on the enlarging side of said first cemented lens in said second lens group, and φL represents a total refracting power of the overall lens system at a maximum focal length state.

5. A finite conjugate distance zoom lens system according to claim 1, further comprising an aperture stop provided in said first lens group.

6. A finite Conjugate distance zoom lens system according to claim 5, wherein said aperture stop shifts together with said first lens group during the zooming mode of operation.

7. A finite conjugate distance zoom lens system according to claim 1, wherein said negative lens element of said first cemented lens is biconcave.

8. A finite conjugate distance zoom lens system according to claim 1, wherein said negative lens element of said second cemented lens is meniscus.

9. A finite conjugate distance zoom lens system comprising sequentially from the enlarging side a first lens group having a negative refracting power, and a second lens group having a positive refracting power, wherein zooming from a maximum focal length state to a minimum focal length state is accomplished by individually shifting said first lens group from the enlarging side to the reducing side and then shifting from the reducing side to the enlarging side to reach the minimum focal length state, while shifting said second lens group from the enlarging side to the reducing side, said second lens group consists of sequentially from the enlarging side, two positive lens elements, first and second cemented lenses both of which consists of a cemented biconvex lens element and a negative lens element, a negative lens element having a concave surface on the enlarging side, and a positive lens element, and wherein the following conditions are fulfilled:

$$n2a<n2b$$

$$n2c<n2d$$

where n2a represents a refractive index of said biconvex lens element of said first cemented lens, n2b represents a refractive index of said negative lens element of said first cemented lens, n2c represents a refractive index of said biconvex lens element of said second cemented lens, and n2d represents a refractive index of said negative lens element of said second cemented lens.

10. A finite conjugate distance zoom lens system according to claim 9, wherein the following conditions are further fulfilled:

$$0.35<nav1-nav2<0.4$$

$$3.0<\phi2/\phi L<3.5$$

$$25<v2a-v2b<40$$

where nav1 represents a mean value of refractive indices of negative lens elements on the reducing side of said biconvex lens element of said first cemented lens in said second lens group, nav2 represents a mean value of refractive indices of positive lens elements on the enlarging side of said first cemented lens in said second lens group, $\phi2$ represents a refracting power of said second lens group, $\phi L$ represents a refracting power of said overall lens system at a maxim focal length state, v2a represents the Abbe number of said biconvex lens element of said first cemented lens, and v2b represents the Abbe number of said negative lens element of said first cemented lens.

11. A finite conjugate distance zoom lens system according to claim 9, wherein the following condition is further fulfilled:

$$3.5<\phi2A/\phi L<4.0$$

where $\phi2A$ represents a total refracting power of positive lens elements on the enlarging side of said first cemented lens in said second lens group, and $\phi L$ represents a total refracting power of said zoom lens system at maximum focal length state.

12. A finite conjugate distance zoom lens system according to claim 9, wherein said first lens group includes a biconcave lens element and a biconvex lens element.

13. A finite conjugate distance zoom lens system according to claim 12, wherein the biconcave lens element and the biconvex lens element of said first lens group are cemented lenses.

14. A finite conjugate distance zoom lens system according to claim 9, wherein said first lens group further includes an aperture stop.

15. A finite conjugate distance zoom lens system according to claim 9, further comprising an aperture stop on the enlarging side of said first lens group.

16. A finite conjugate distance zoom lens system according to claim 9, wherein said negative lens element of said first cemented lens is biconcave.

17. A finite conjugate distance zoom lens system according to claim 9, wherein said negative lens element of said second cemented lens is meniscus.

18. A finite conjugate distance zoom lens system comprising sequentially from the enlarging side a first lens group having a negative refracting power, and a second lens group having a positive refracting power, wherein zooming from a maximum focal length state to a minimum focal length state is accomplished by individually shifting said first lens group from the enlarging side to the reducing side and then shifting from the reducing side to the enlarging side, while shifting said second lens group from the enlarging side to the reducing side, said second lens group consists of sequentially from the enlarging side three positive lens elements, first and second cemented lenses both of which consists of a cemented biconvex lens element and a negative lens element, a negative lens element having a concave surface on the enlarging side, and a positive lens element, and wherein the following conditions are fulfilled:

$$n2a<n2b$$

$$n2c<n2d$$

where n2a represents a refractive index of said biconvex lens element of said first cemented lens, n2b represents a refractive index of said negative lens element of said first cemented lens, n2c represents a refractive index of said biconvex lens element of said second cemented lens, and n2d represents a refractive index of said negative lens element of said second cemented lens.

19. A finite conjugate distance zoom lens system according to claim 18, wherein the following conditions are further fulfilled:

$$0.35<nav1-nav2<0.4$$

$$3.0<\phi2/\phi L<3.5$$

$$40<v2c-v2d<60$$

where nav1 represents a mean value of refractive indices of negative lens elements on the reducing side of said biconvex lens element of said first cemented lens in said second lens group, nav2 represents a mean value of refractive indices of positive lens elements on the enlarging side of said first cemented lens in said second lens group, $\phi2$ represents a refracting power of said second lens group, $\phi L$ represents a refracting power of said overall lens system at a maximum focal length state, v2c represents the Abbe number of said biconvex lens element of said first cemented lens, and v2d represents the Abbe number of said negative lens element of said first cemented lens.

20. A finite conjugate distance zoom lens system according to claim 18, wherein the following condition is further fulfilled:

$$3.5<\phi2A/\phi L<4.0$$

where $\phi2A$ represents a total refracting power of said positive lens elements on the enlarging side of said first cemented lens in said second lens group, and $\phi L$ represents a total refracting power of said overall lens system at a maximum focal length state.

21. A finite conjugate distance zoom lens system according to claim 18, wherein said first lens group includes a biconcave lens element and a positive meniscus lens element.

22. A finite conjugate distance zoom lens system according to claim 21, wherein the biconcave lens element and the positive meniscus lens element of said first lens group are cemented lenses.

23. A finite conjugate distance zoom lens system according to claim 18, wherein said first lens group further includes an aperture stop.

24. A finite conjugate distance zoom lens system according to claim 18, further comprising an aperture stop on the enlarging side of said first lens group.

25. A finite conjugate distance zoom lens system according to claim 18, wherein said negative lens element of said first cemented lens is biconcave.

26. A finite conjugate distance zoom lens system according to claim 18, wherein said negative lens element of said second cemented lens is meniscus.

27. A finite conjugate distance zoom lens system comprising sequentially from an enlarging side:

a first lens group having a negative refracting power and including a biconcave lens element and a biconvex lens element; and a second lens group having a positive refracting power and consisting of sequentially from the enlarging side, two biconvex lens elements, a first cemented lens consisting of a cemented biconvex lens element and a biconcave lens element, a second cemented lens consisting of a cemented biconvex lens element and a negative meniscus lens element, a biconcave lens element, and a biconvex lens element, wherein zooming from a maximum focal length state to a minimum focal length state is accomplished by individually shifting said first lens group from the enlarging side to the reducing side and then shifting from the reducing side to the enlarging side to reach the minimum focal length state, while shifting said second lens group from the enlarging side to the reducing side.

28. A finite conjugate distance zoom lens system according to claim 27, wherein the biconcave lens element and the biconvex lens element of said first lens group are cemented to each other.

29. A finite conjugate distance zoom lens system comprising sequentially from an enlarging side;

a first lens group having a negative refracting power and including a biconcave lens element and a positive meniscus lens element; and a second lens group having a positive refracting power and consisting of sequentially from the enlarging side, a biconvex lens element, a positive meniscus lens element, a biconvex lens element, a first cemented lens consisting of a cemented biconvex lens element and a biconcave lens element, a second cemented lens consisting of a cemented biconvex lens element and a negative meniscus lens element, a biconcave lens element, and a biconvex lens element, wherein zooming from a maximum focal length state to a minimum focal length state is accomplished by individually shifting said first lens group from the enlarging side to the reducing side and then shifting from the reducing side to the enlarging side to reach the minimum focal length state, while shifting said second lens group from the enlarging side to the reducing side.

30. A finite conjugate distance zoom lens system according to claim 29, wherein the biconcave lens element and the positive meniscus lens element of said first lens group are cemented to each other.

* * * * *